(12) United States Patent
Beach et al.

(10) Patent No.: US 12,337,995 B2
(45) Date of Patent: Jun. 24, 2025

(54) SUPPORT PIN ASSEMBLY, SUPPORT SYSTEM, AND METHOD FOR THE SAME

(71) Applicant: The Boeing Company, Arlington, VA (US)

(72) Inventors: Brent A. Beach, Chesterfield, MO (US); Colleen A. Oberlee, Saint Charles, MO (US); Timothy L. Smith, Brighton, IL (US); Michael A. Ward, University City, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/446,270

(22) Filed: Aug. 8, 2023

(65) Prior Publication Data
US 2025/0051036 A1 Feb. 13, 2025

(51) Int. Cl.
  *B64F 5/10* (2017.01)
  *B23Q 3/18* (2006.01)
  *B25B 11/02* (2006.01)
  *B25B 27/00* (2006.01)

(52) U.S. Cl.
  CPC ............... *B64F 5/10* (2017.01); *B23Q 3/186* (2013.01); *B25B 11/02* (2013.01); *B25B 27/00* (2013.01)

(58) Field of Classification Search
  CPC . B64F 5/10; B23Q 3/186; B25B 11/02; B25B 27/00
  See application file for complete search history.

(56) References Cited

U.S. PATENT DOCUMENTS

| | | | | |
|---|---|---|---|---|
| 4,285,377 A | * | 8/1981 | Hart | F16B 39/04 411/347 |
| 4,390,153 A | * | 6/1983 | Wuermseer | B64C 1/26 403/287 |
| 4,943,013 A | * | 7/1990 | Kapala | F16C 11/045 244/54 |
| 6,314,630 B1 | * | 11/2001 | Munk | B25B 5/122 29/469 |
| 6,474,596 B1 | * | 11/2002 | Cousin | B64D 27/40 244/54 |
| 8,083,177 B2 | * | 12/2011 | Renon | B64D 27/40 244/54 |
| 8,561,941 B2 | * | 10/2013 | Combes | B64D 29/06 244/54 |
| 9,527,599 B2 | * | 12/2016 | Deforet | B64D 27/40 |
| 2005/0116105 A1 | | 6/2005 | Munk et al. | |
| 2024/0200378 A1 | * | 6/2024 | Becker | E05D 15/00 |

* cited by examiner

Primary Examiner — Seahee Hong

(57) ABSTRACT

There is provided a support pin assembly for full size determinant assembly of an aircraft structure. The support pin assembly includes a block having a vertical bore and a horizontal bore; a bushing within the horizontal bore; a barrel nut having a cylindrical body within the vertical bore and a barrel nut hole; and a pin. The pin includes an insertion portion within the bushing, an interface element, and an extending portion having at least one protruding circumferential portion having two or more flat surface portions on opposing sides to enable rotation of the pin. The at least one protruding circumferential portion is positioned within a hole in a frame section of the aircraft structure, and provides nominal adjustment of the pin, so that with any binding condition of the pin, the pin is released by rotating the pin via the two or more flat surface portions.

20 Claims, 19 Drawing Sheets

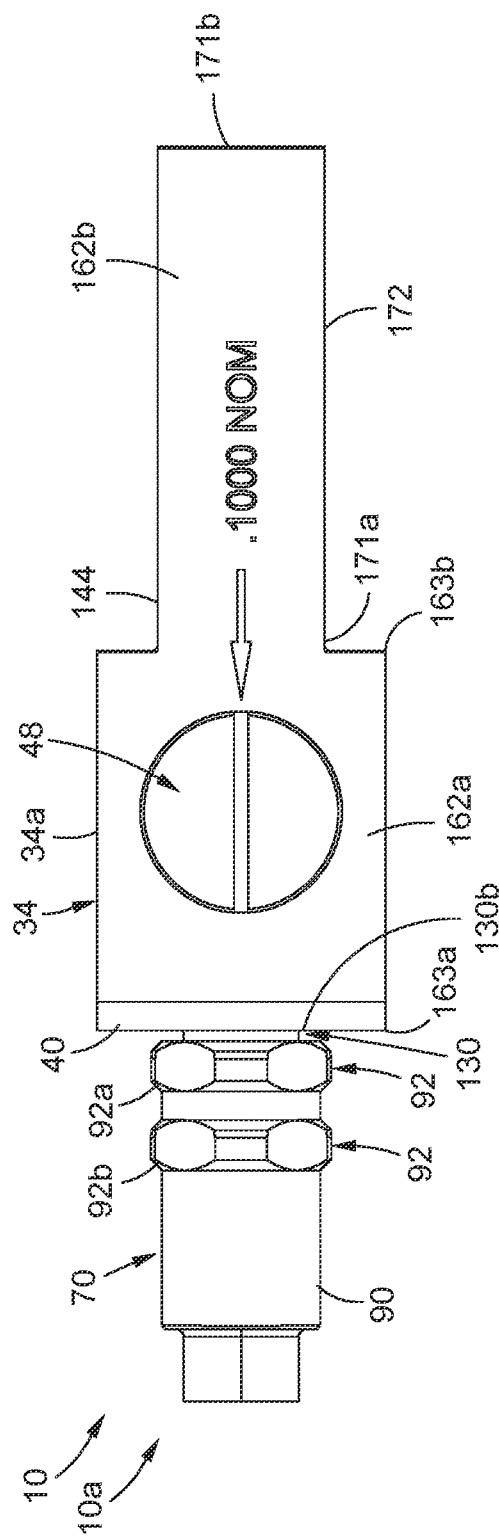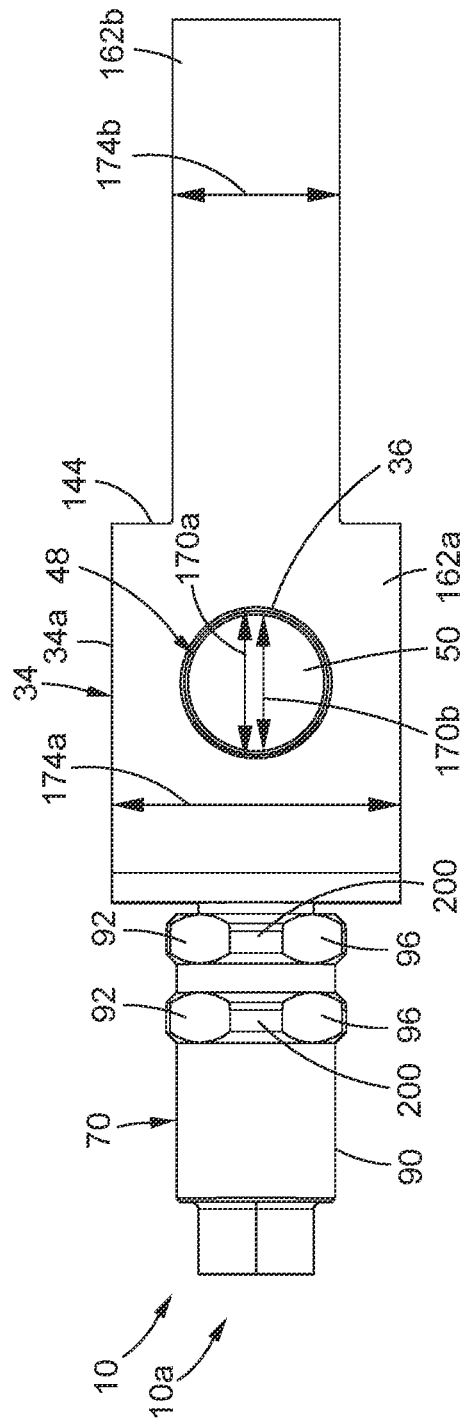

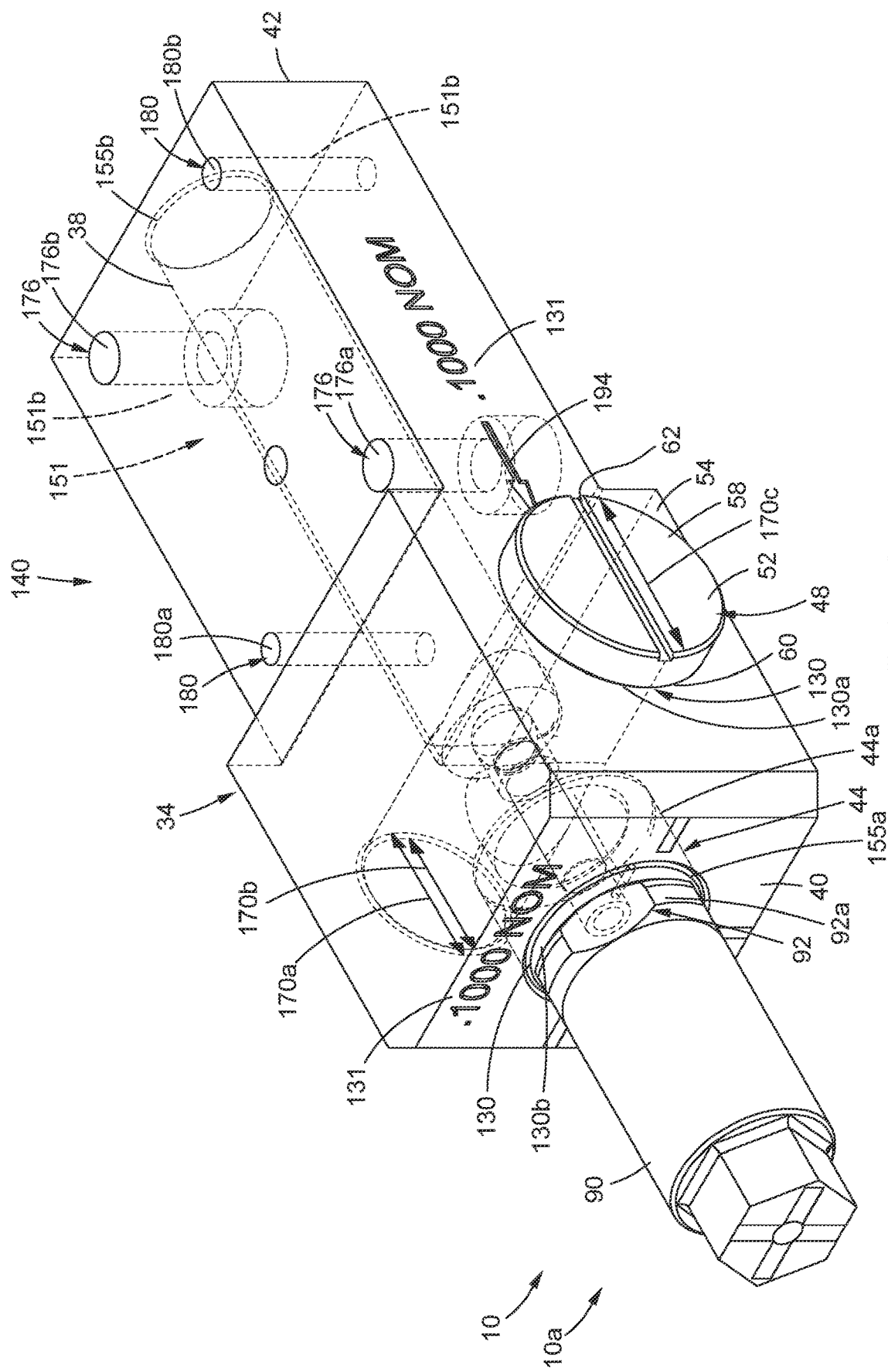

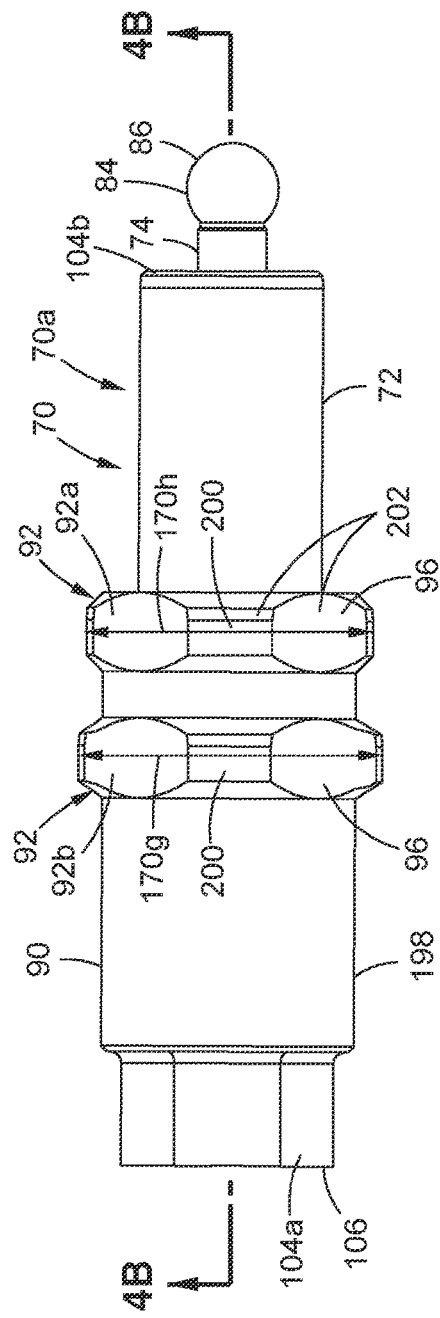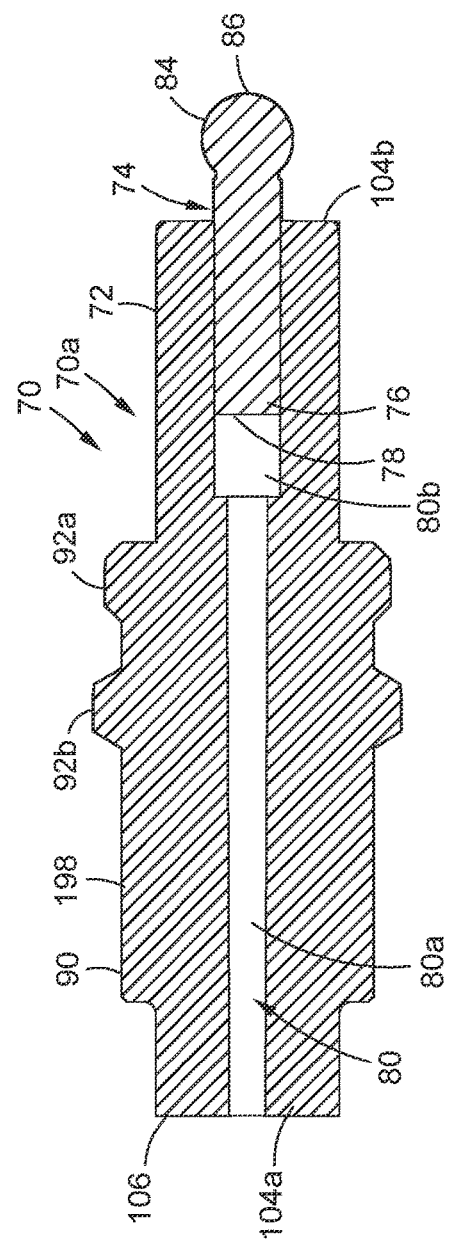
FIG. 4A
FIG. 4B

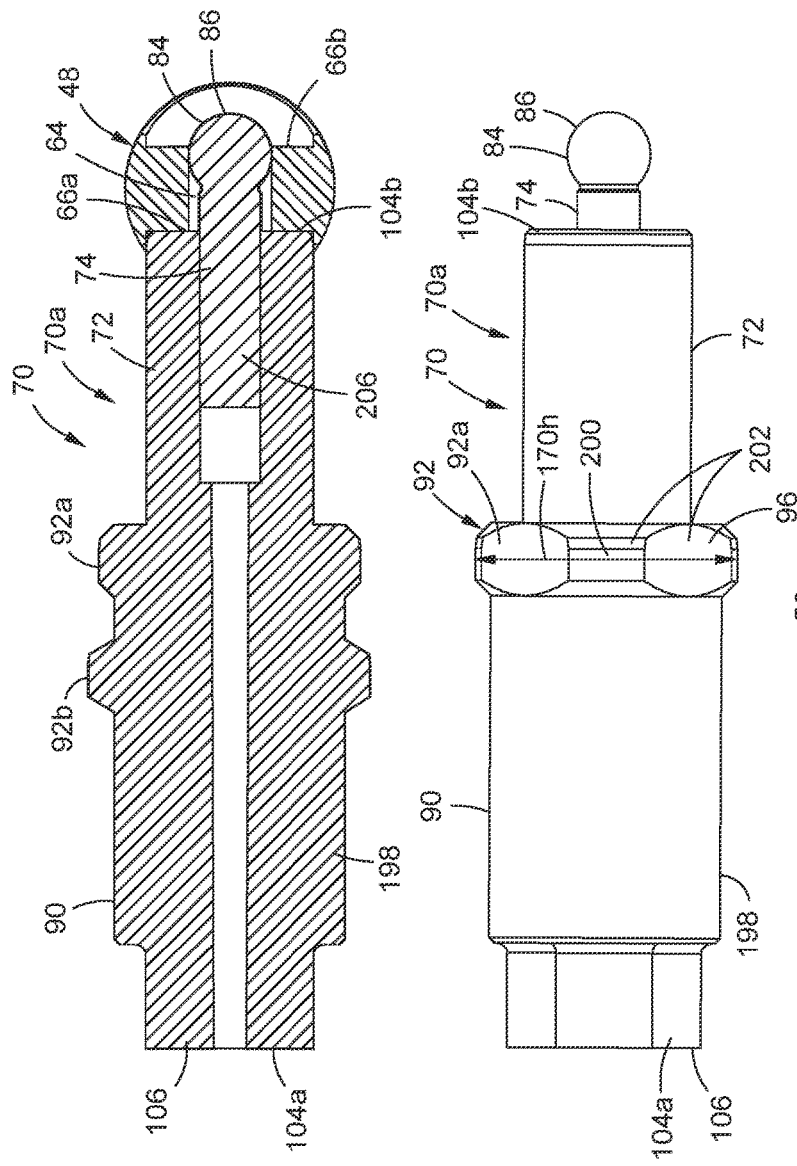
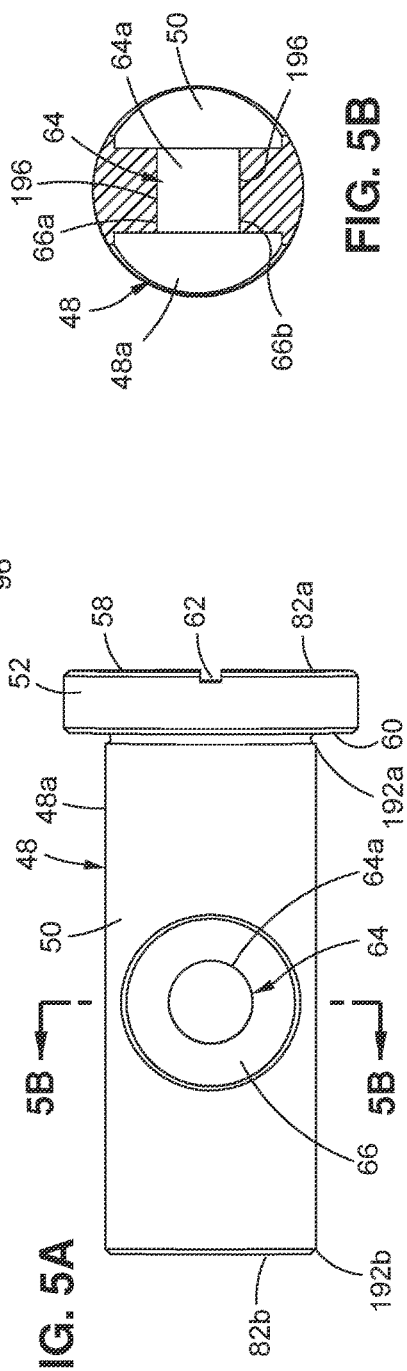

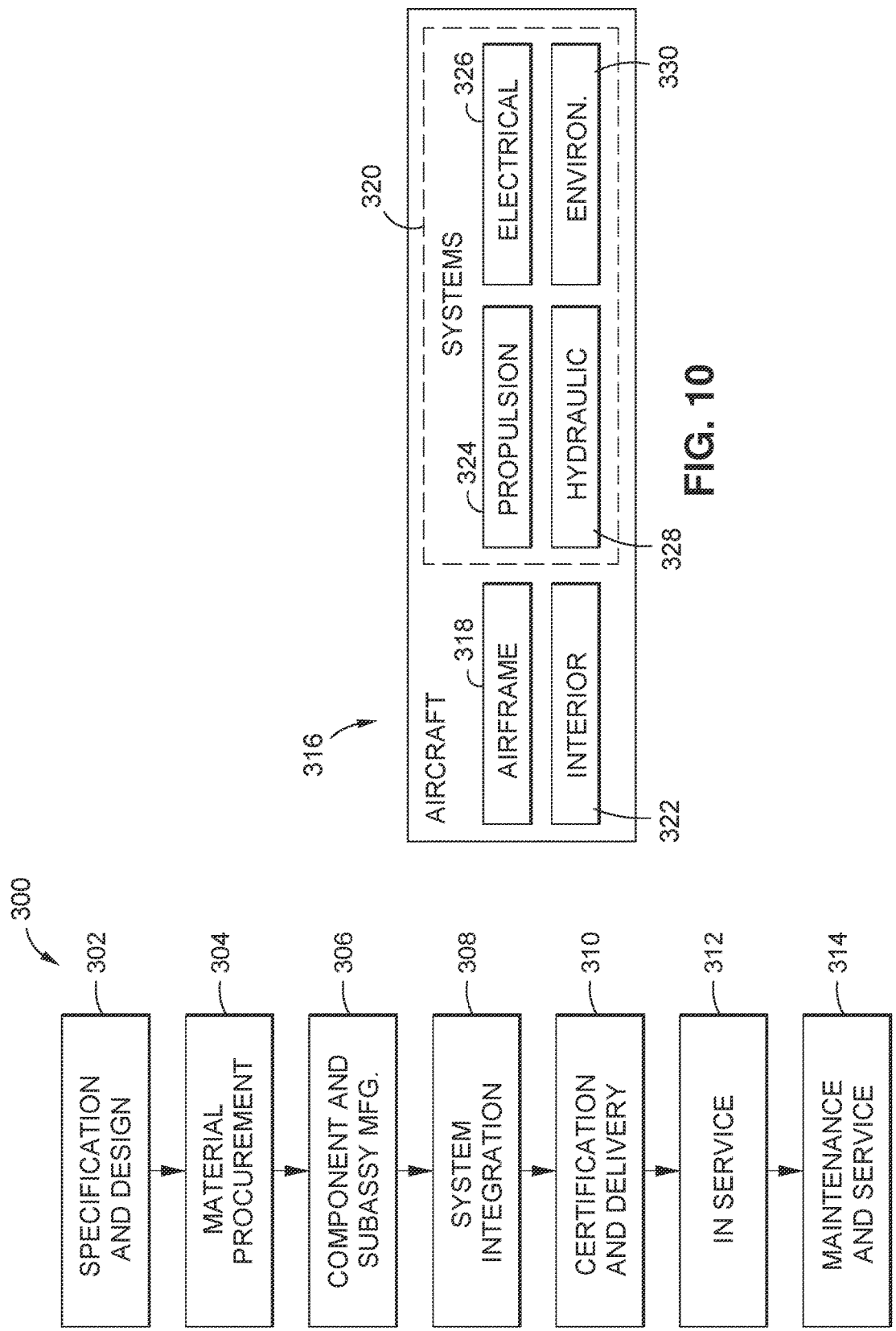

SUPPORT PIN ASSEMBLY, SUPPORT SYSTEM, AND METHOD FOR THE SAME

CROSS-REFERENCE TO RELATED APPLICATION

This nonprovisional patent application is related to contemporaneously filed U.S. nonprovisional patent application Ser. No. 18/446,322, titled SUPPORT PIN ASSEMBLY, SUPPORT SYSTEM, AND METHOD FOR THE SAME, filed on Aug. 8, 2023, the contents of which are hereby incorporated by reference in their entirety. By mention in this CROSS-REFERENCE TO RELATED APPLICATION section, the application having U.S. application Ser. No. 18/446,270 is not admitted to be prior art with respect to this application having U.S. aplication Ser. No, 18/446,322.

FIELD

The disclosure relates generally to assemblies, systems, and methods for full size determinant assembly, and more particularly, to support pin assemblies, support systems, and methods for the same, to enable full size determinant assembly of aircraft structures for aircraft.

BACKGROUND

Full size determinant assembly is a precision assembly or manufacturing method or process that uses alignment features, such as holes, to index component parts and assemblies relative to each other, and that eliminates or minimizes the use of hard tooling by replacing it with self-locating detail parts that determine the configuration of the assembly by their own dimensions and certain coordinating features incorporated into the design of the parts. Full size determinant assembly uses automated machines to drill clean, precise, full-size holes in advance of assembling the structure, and such holes then line up easily for insertion of fasteners without the need to take it apart. Full size determinant assembly is increasingly used to assemble and manufacture aircraft structures, such as wings and fuselage.

Known methods and systems used to enable full size determinant assembly of aircraft structures, such as wings and fuselage, or other engineering parts, use assembly jigs, fixtures, and pins to position and support frame sections of such aircraft structures or other engineering parts, including inserting pins through holes or slots in the frame sections held by the assembly jig and/or fixtures. When the pins are rotated in the holes or slots, there is a possibility that the pins may get locked in the assembly jig or fixture or that the pins may bind and become immovable. Such known methods and systems do not allow for pin adjustment or pin float and do not allow for pin release in the event of pin binding or assembly jig lock. This may result in removal of the jig assembly or fixture and possible damage to the holes of the frame section. Thus, full size determinant assembly may not be achieved due to over-constraining, build-up, and possible pin binding.

It would be desirable to solve the problem of assembly jig lock and pin binding to accurately position and support aircraft structures, such as frame sections of wings, to enable full size determinant assembly. Accordingly, there is a need in the art for an improved support pin assembly, support system, and method for supporting an aircraft structure for full size determinant assembly that provide a means for pin adjustment or pin float, that provide a means for pin release in the event of pin binding, and that provide other advantages over known systems and methods.

SUMMARY

Example implementations of the present disclosure provide a support pin assembly, support system, and method for supporting an aircraft structure for full size determinant assembly. As discussed in the below detailed description, versions of the support pin assembly, support system, and method may provide significant advantages over known systems and methods.

In a version of the disclosure, there is provided a support pin assembly for full size determinant assembly of an aircraft structure. The support pin assembly comprises a block having a vertical bore and a horizontal bore intersecting the vertical bore. The support pin assembly further comprises a bushing disposed within the horizontal bore at a first end of the block.

The support pin assembly further comprises a barrel nut having a cylindrical body disposed within the vertical bore. The cylindrical body has a barrel nut hole extending transversely through the cylindrical body. The barrel nut hole is aligned with the horizontal bore.

The support pin assembly further comprises a pin. The pin comprises an insertion portion disposed within the bushing. The pin further comprises an interface element having an interface element first end disposed within the insertion portion and an interface element second end disposed within the barrel nut hole. The pin further comprises an extending portion extending from the first end of the block. The extending portion has at least one protruding circumferential portion formed on an exterior of the extending portion. The at least one protruding circumferential portion has two or more flat surface portions on opposing sides of the at least one protruding circumferential portion to enable rotation of the pin.

The at least one protruding circumferential portion on the extending portion of the pin is configured to be positioned within a hole in a frame section of the aircraft structure for the full size determinant assembly, and is configured to provide nominal adjustment of the pin relative to the hole, so that with any occurrence of a binding condition of the pin within the hole, the pin is configured to be released from the binding condition by rotating the pin via the two or more flat surface portions.

In another version of the disclosure, there is provided a support system for full size determinant assembly of an aircraft structure. The support system comprises an assembly jig. The support system further comprises a frame section of the aircraft structure for the full size determinant assembly. The frame section is positioned on, and supported by, the assembly jig.

The support system further comprises one or more support pin assemblies. Each support pin assembly comprises a block coupled to the assembly jig. The block has a vertical bore and a horizontal bore intersecting the vertical bore. Each support pin assembly further comprises a bushing disposed within the horizontal bore at a first end of the block. Each support pin assembly further comprises a barrel nut having a cylindrical body disposed within the vertical bore. The cylindrical body has a barrel nut hole extending transversely through the cylindrical body. The barrel nut hole is aligned with the horizontal bore.

Each support pin assembly further comprises a pin. The pin comprises an insertion portion disposed within the bushing. The pin further comprises an interface element having an interface element first end disposed within the insertion portion and an interface element second end disposed within the barrel nut hole. The pin further comprises an extending portion extending from the first end of the block. The extending portion has at least one protruding circumferential portion formed on an exterior of the extending portion. The at least one protruding circumferential portion has two or more flat surface portions on opposing sides of the at least one protruding circumferential portion to enable rotation of the pin.

The at least one protruding circumferential portion on the extending portion of the pin is positioned within a hole in the frame section of the aircraft structure, and provides nominal adjustment of the pin relative to the hole, so that with any occurrence of a binding condition of the pin within the hole, the pin is released from the binding condition by rotating the pin via the two or more flat surface portions.

In another version of the disclosure, there is provided a method of supporting an aircraft structure for full size determinant assembly. The method comprises coupling one or more support pin assemblies to an assembly jig. Each support pin assembly comprises a block having a vertical bore and a horizontal bore intersecting the vertical bore, wherein the block is coupled to the assembly jig.

Each support pin assembly further comprises a bushing disposed within the horizontal bore at a first end of the block. Each support pin assembly further comprises a barrel nut having a cylindrical body disposed within the vertical bore. The cylindrical body has a barrel nut hole extending transversely through the cylindrical body. The barrel nut hole is aligned with the horizontal bore.

Each support pin assembly further comprises a pin. The pin comprises an insertion portion disposed within the bushing. The pin further comprises an interface element having an interface element first end disposed within the insertion portion and an interface element second end disposed within the barrel nut hole. The pin further comprises an extending portion extending from the first end of the block. The extending portion has at least one protruding circumferential portion formed on an exterior of the extending portion. The at least one protruding circumferential portion has two or more flat surface portions on opposing sides of the at least one protruding circumferential portion to enable rotation of the pin.

The method further comprises positioning and supporting a frame section of the aircraft structure for the full size determinant assembly on the assembly jig. The method further comprises positioning the at least one protruding circumferential portion on the extending portion of the pin of one of the one or more support pin assemblies within a hole in the frame section of the aircraft structure, to provide nominal adjustment of the pin relative to the hole, so that with any occurrence of a binding condition of the pin within the hole, the pin is released from the binding condition by rotating the pin via the two or more flat surface portions.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2C is an illustration of a top view of the support pin assembly of FIG. 2A;

FIG. 2D is an illustration of a bottom view of the support pin assembly of FIG. 2A;

FIG. 2I is an illustration of a top perspective view of another exemplary version of a support pin assembly of the disclosure in an assembled configuration, showing a pin with one protruding circumferential portion;

FIG. 4A is an illustration of a right side perspective view of an exemplary version of a pin with two protruding circumferential portions;

FIG. 4B is an illustration of a cross-sectional view of the pin of FIG. 4A, taken along lines 4B-4B of FIG. 4A;

FIG. 4C is an illustration of a cross-sectional view of the pin of FIG. 4A, where the pin is coupled to a barrel nut;

FIG. 4D is an illustration of a right side perspective view of another exemplary version of a pin with one protruding circumferential portion;

FIG. 5A is an illustration of a front view of an exemplary version of a barrel nut;

FIG. 5B is an illustration of a cross-sectional view of the barrel nut of FIG. 5A, taken along lines 5B-5B of FIG. 5A;

FIG. 9 is an illustration of a flow diagram of an exemplary aircraft manufacturing and service method; and FIG. 10 is an illustration of an exemplary block diagram of an aircraft.

Figure 1:
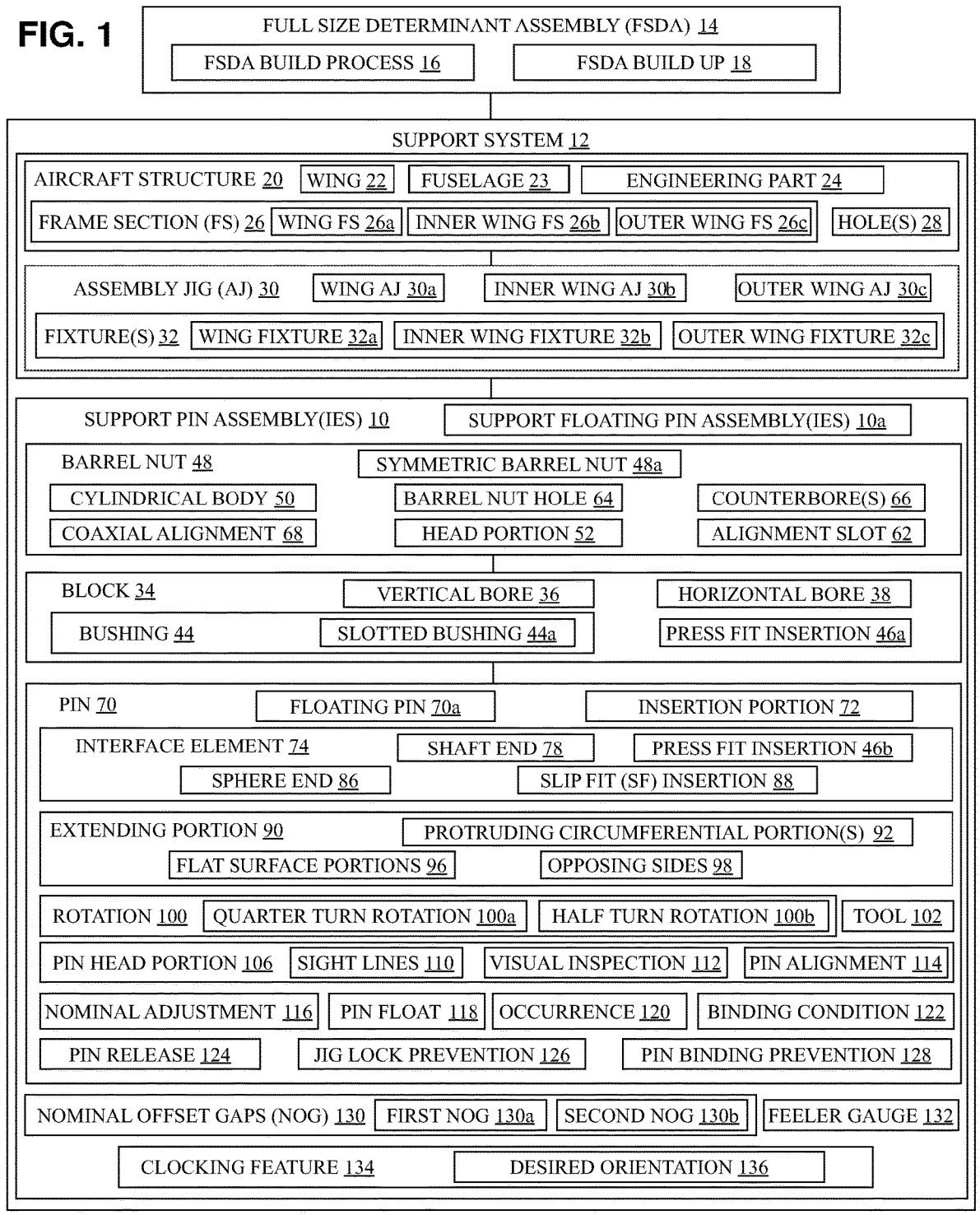
FIG. 1 is an illustration of a block diagram of an exemplary version of a support pin assembly of the disclosure that is part of an exemplary support system of the disclosure for full size determinant assembly.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary version of a support pin assembly 10, such as a support floating pin assembly 10*a*, of the disclosure that is part of an exemplary support system 12 of the disclosure for full size determinant assembly (FSDA) 14, including a full size determinant assembly (FSDA) build process 16 and a full size determinant assembly (FSDA) build up 18, of an aircraft structure 20, such as a wing 22, a fuselage 23, or another suitable aircraft structure. As used herein, "full size determinant assembly" means a precision assembly or manufacturing method or process that uses alignment features, such as holes produced to their final size at a detail part level as opposed to match drilling holes during an assembly operation, to index component parts and assemblies relative to each other, and that eliminates or minimizes the use of hard tooling by replacing it with self-locating detail parts that determine the configuration of the assembly by their own dimensions and certain coordinating features incorporated into the design of the parts.

The blocks in FIG. 1 represent elements, and lines connecting the various blocks do not imply any particular dependency of the elements. Furthermore, the connecting lines shown in the various figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the support pin assembly 10 and the support system 12 in FIG. 1 are not meant to imply physical or architectural limitations to the manner in which an illustrative example may be implemented. Other components in addition to, or in place of, the ones illustrated may be used. Some components may be unnecessary.

The one or more support pin assemblies 10 are designed to pin in place and support an engineering part 24 (see FIG. 1), while having the ability to float or be nominally adjusted for the full size determinant assembly build process 16. As shown in FIG. 1, in one version, the engineering part 24 comprises a frame section (FS) 26 of the aircraft structure 20, where the frame section 26 has one or more holes 28 through the frame section 26 configured for coupling with one or more support pin assemblies 10. As shown in FIG. 1, the frame section 26 may comprise a wing frame section (FS) 26*a*, such as an inner wing frame section (FS) 26*b*, an outer wing frame section (FS) 26*c*, or another suitable wing frame section. In other versions, the engineering part 24 comprises other suitable aircraft structures or parts, for example, a fuselage frame section.

The support system 12 further comprises an assembly jig (AJ) 30 (see FIG. 1). As shown in FIG. 1, in one version, the assembly jig 30 may comprise a wing assembly jig (AJ) 30*a*, such as an inner wing assembly jig (AJ) 30*b*, an outer wing assembly jig (AJ) 30*c*, or another suitable wing assembly jig. In other versions, the assembly jig 30 comprises other suitable types of assembly jigs, for example, a fuselage assembly jig. As used herein, "assembly jig" means an assembly that determines both a location of the assembly and a position of assembly features, such as holes, in a manufacturing process, such as full size determinant assembly. The assembly jig 30 may also be referred to as a tool or a full tool.

As shown in FIG. 1, the support system 12 further comprises one or more fixtures 32, or fixture assemblies. The assembly jig 30 comprises the one or more fixtures 32 or fixture assemblies that make up the full assembly jig 30. As shown in FIG. 1, in one version, the fixture 32 may comprise a wing fixture 32a, such as an inner wing fixture 32b, an outer wing fixture 32c, or another suitable wing fixture. In other versions, the fixture 32 comprises other suitable types of fixture devices or apparatuses, such as a fuselage fixture. The frame section 26 of the aircraft structure 20 for the full size determinant assembly 14 is positioned on, and supported by, the one or more fixtures 32 or fixture assemblies that make up the assembly jig 30. As used herein, a "fixture" or a "fixture assembly" means a support structure or apparatus that is part of an assembly jig, to hold, support, and locate an assembly in a manufacturing process, such as full size determinant assembly, but the fixture does not determine a position of assembly features, such as holes.

Figure 2A:
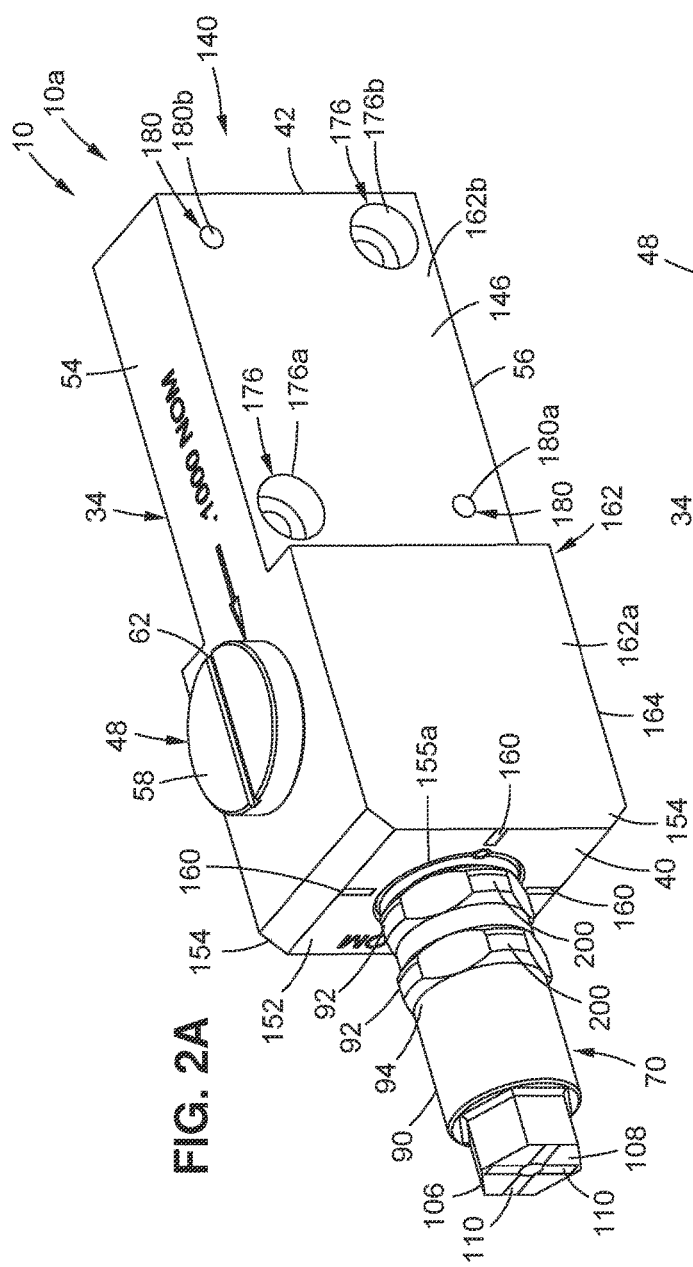
FIG. 2A is an illustration of a right side perspective view of an exemplary version of a support pin assembly of the disclosure in an assembled configuration, showing a pin with two protruding circumferential portions.

As shown in FIG. 1, the support system 12 further comprises one or more support pin assemblies 10, such as one or more support floating pin assemblies 10a. As shown in FIG. 1, the support pin assembly 10 comprises a block 34 having a vertical bore 36 and a horizontal bore 38 intersecting with the vertical bore 36. As shown in FIG. 2A, the block 34 comprises a first end 40, or front end, and a second end 42, or back end. The block 34 is discussed below in further detail with respect to FIGS. 2A-2I.

As shown in FIG. 1, the support pin assembly 10 further comprises a bushing 44 disposed within the horizontal bore 38 at the first end 40 of the block 34. Preferably, the bushing 44 comprises a slotted bushing 44a (see FIG. 1) and is designed for a press fit insertion 46a (see FIG. 1) within the horizontal bore 38 at the first end 40 of the block 34. The bushing 44 is discussed below in further detail with respect to FIG. 3.

As shown in FIG. 1, the support pin assembly 10 further comprises a barrel nut 48. As used herein, "barrel nut" means a cylindrical component having a hole, and optionally one or more counterbores, extending transversely through the cylindrical component to secure connections between parts, where the cylindrical component is configured to fit within a bore, optionally has a head portion, and has an alignment slot at a top end.

As further shown in FIG. 1, in one version, the barrel nut 48 comprises a cylindrical body 50 and a head portion 52 integral with the cylindrical body 50. In another version, the barrel nut 48 may comprise the cylindrical body 50 without the head portion 52. As shown in FIG. 2G, the cylindrical body 50 is disposed within the vertical bore 36, and the cylindrical body 50 and the vertical bore 36 both extend from a top side 54 of the block 34 to a bottom side 56 of the block 34. The barrel nut 48 is free to rotate within the vertical bore 36 of the block 34. As further shown in FIG. 2G, the head portion 52 extends from the cylindrical body 50 exterior to the vertical bore 36 at the top side 54 of the block 34, and the head portion 52 has a top end 58 and a bottom end 60. The barrel nut 48 further comprises an alignment slot 62 (see FIG. 1) formed in the top end 58 of the head portion 52. Alternatively, if there is no head portion 52, the alignment slot 62 may be formed in a first end 192a (see FIG. 5A), or top end, of the cylindrical body 50.

As shown in FIG. 1, the cylindrical body 50 of the barrel nut 48 comprises a barrel nut hole 64, such as an unthreaded barrel nut hole 64a (see FIG. 5A), and may optionally comprise at least one counterbore 66, extending transversely through the cylindrical body 50. In one version, as shown in FIG. 2G, the barrel nut 48 comprises a symmetric barrel nut 48a (see also FIG. 1), with counterbores 66 on both sides 196 of the barrel nut hole 64, including a first counterbore 66a and a second counterbore 66b, extending transversely through the cylindrical body 50. In another version, the barrel nut 48 comprises one counterbore 66 on one side 196 of the barrel nut hole 64, including the first counterbore 66a, where the counterbore 66 extends transversely through the cylindrical body 50. The barrel nut hole 64 and the counterbore 66, such as the at least one counterbore 66, are aligned with the horizontal bore 38 of the block 34 and are in coaxial alignment 68 (see FIG. 1) with the horizontal bore 38 of the block 34. The alignment slot 62 is visible to enable alignment of the barrel nut hole 64 of the barrel nut 48 with the horizontal bore 38. The barrel nut 48 is discussed below in further detail with respect to FIGS. 2A-2I and FIGS. 5A-5B.

As shown in FIG. 1, the support pin assembly 10 further comprises a pin 70, such as a floating pin 70a. The pin 70 comprises an insertion portion 72 (see FIG. 1) disposed, in one version, within the bushing 44, and in another version within the bushing 44 and the one or more counterbores 66. The pin 70 further comprises an interface element 74 (see FIG. 1). The interface element 74 has an interface element first end 76 (see FIG. 2G), comprising a shaft end 78 (see FIGS. 1, 2G), disposed or press fit within an interior bore 80 (see FIG. 2G) of the pin 70, and in particular, within the insertion portion 72, such as by a press fit insertion 46b (see FIG. 1). The interface element 74 further has an interface element second end 84 (see FIG. 2G), comprising, in one version, a sphere end 86 (see FIGS. 1, 2G), disposed or slip fit within the barrel nut hole 64, such as by a slip fit insertion 88 (see FIG. 1).

As shown in FIG. 1, the pin 70 further comprises an extending portion 90. The extending portion 90 extends from, and is exterior to, the first end 40 of the block 34. As shown in FIG. 1, the extending portion 90 has at least one protruding circumferential portion 92, and the extending portion 90 preferably has at least two protruding circumferential portions 92. The at least one protruding circumferential portion 92 (see FIG. 2I), or preferably, the at least two protruding circumferential portions 92 (see FIGS. 2A-2H), is/are formed on an exterior 94 (see FIG. 2A) of the extending portion 90. As shown in FIG. 1, each of the at least one protruding circumferential portions 92 has two or more flat surface portions 96, also referred to as "flats", that are machined on opposing sides 98 (see FIG. 2E) of the protruding circumferential portion 92, to enable a rotation 100 of the pin 70. As shown in FIG. 1, the rotation 100 of the pin 70 comprises a quarter turn rotation 100a or a half turn rotation 100b. The rotation 100 may further comprise another suitable rotation. When the at least one protruding circumferential portion 92 has four flat surface portions 96, the quarter turn rotation 100a of the pin 70 is enabled. When the at least one protruding circumferential portion 92 has two flat surface portions 96, the half turn rotation 100b of the pin 70 is enabled.

The pin 70 has a first end 104a (see FIG. 4A) comprising a pin head portion 106 (see FIGS. 1, 5A) at the extending portion 90 (see FIG. 1, 4A), and a second end 104b (see FIG. 4A). The pin head portion 106 has an outer surface 108 (see FIG. 2A) with sight lines 110 (see FIGS. 1, 2A) for visual inspection 112 (see FIG. 1) of pin alignment 114 (see FIG. 1) of the pin 70 relative to the bushing 44 (see FIG. 1), such as the slotted bushing 44a (see FIG. 1), so that the at least one protruding circumferential portion 92 of the pin 70 is aligned to an inner diameter 170f (see FIG. 3) of the bushing 44 (see FIG. 3), such as the slotted bushing 44a (see FIG. 1). The first end 104a, such as the pin head portion 106, of the pin 70 is configured to be rotated by a tool 102 (see FIG. 1), such as a wrench or another suitable tool, or is configured to be rotated manually by hand by a user, depending on a binding condition 122 (see FIG. 1) of the pin 70.

Figure 6A:
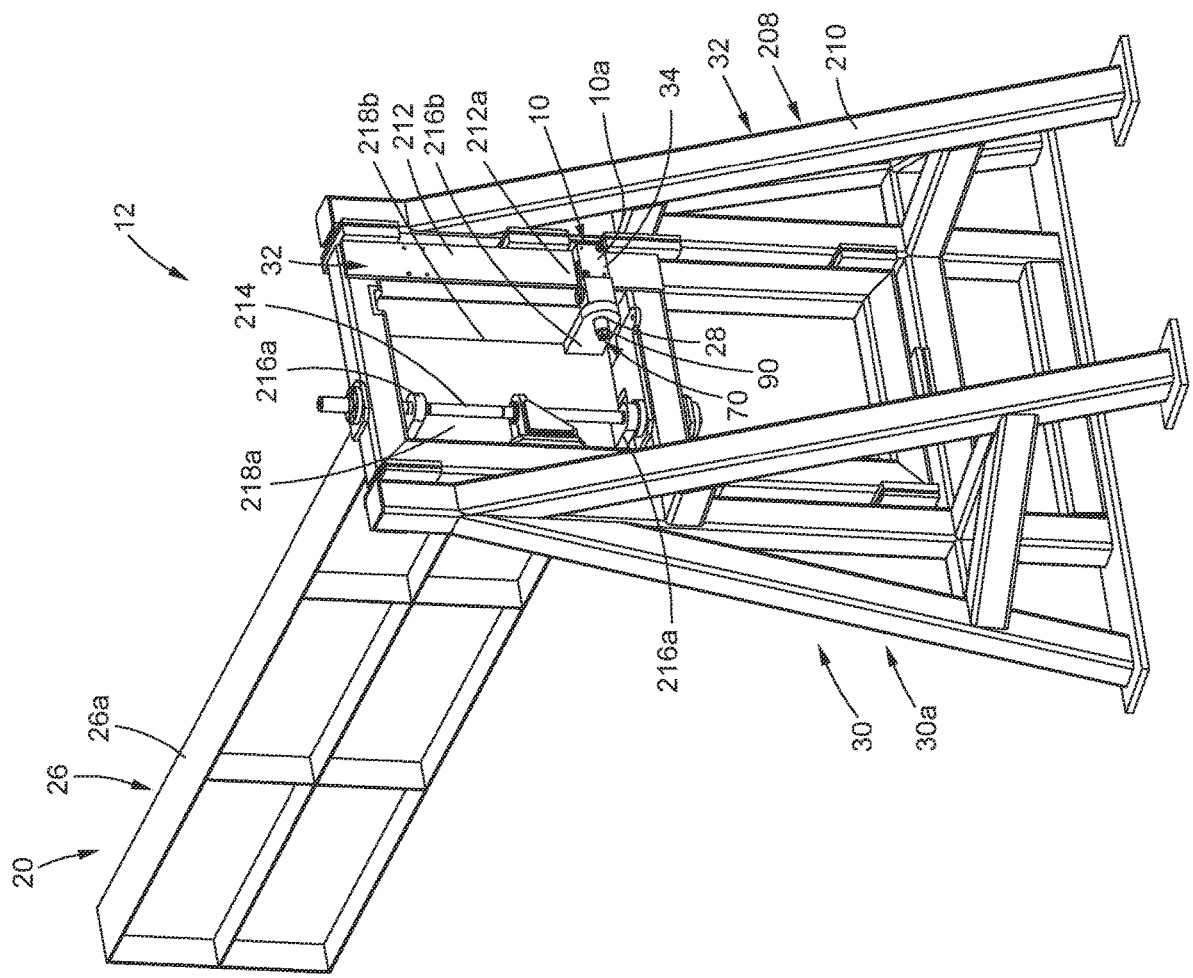
FIG. 6A is an illustration of a right side perspective view of an exemplary version of a support system of the disclosure with a support pin assembly of the disclosure, showing an exemplary version of a frame section of an aircraft structure and an exemplary version of an assembly jig.
Figure 6B:
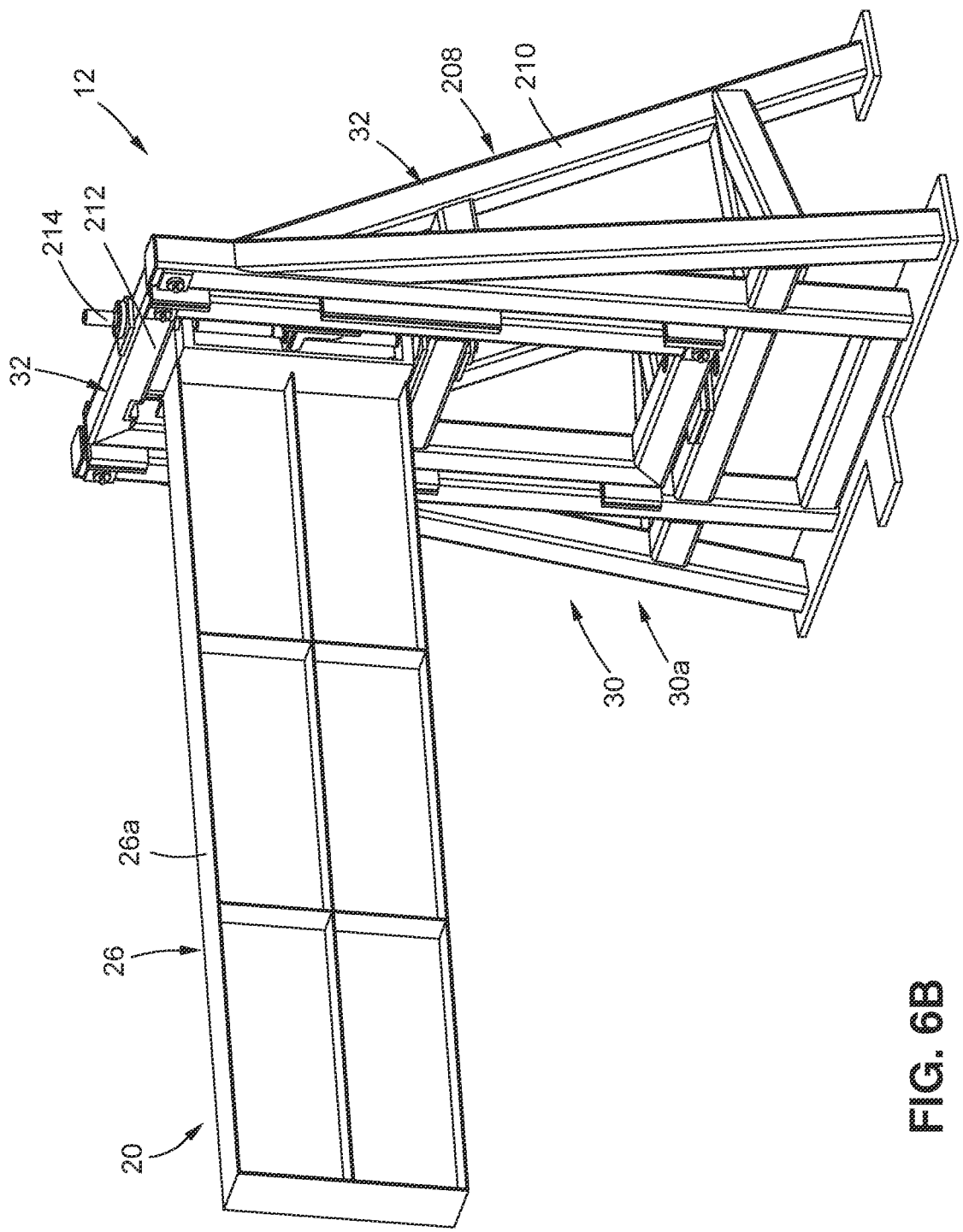
FIG. 6B is an illustration of a front perspective view of the support system of FIG. 6A.
Figure 6C:
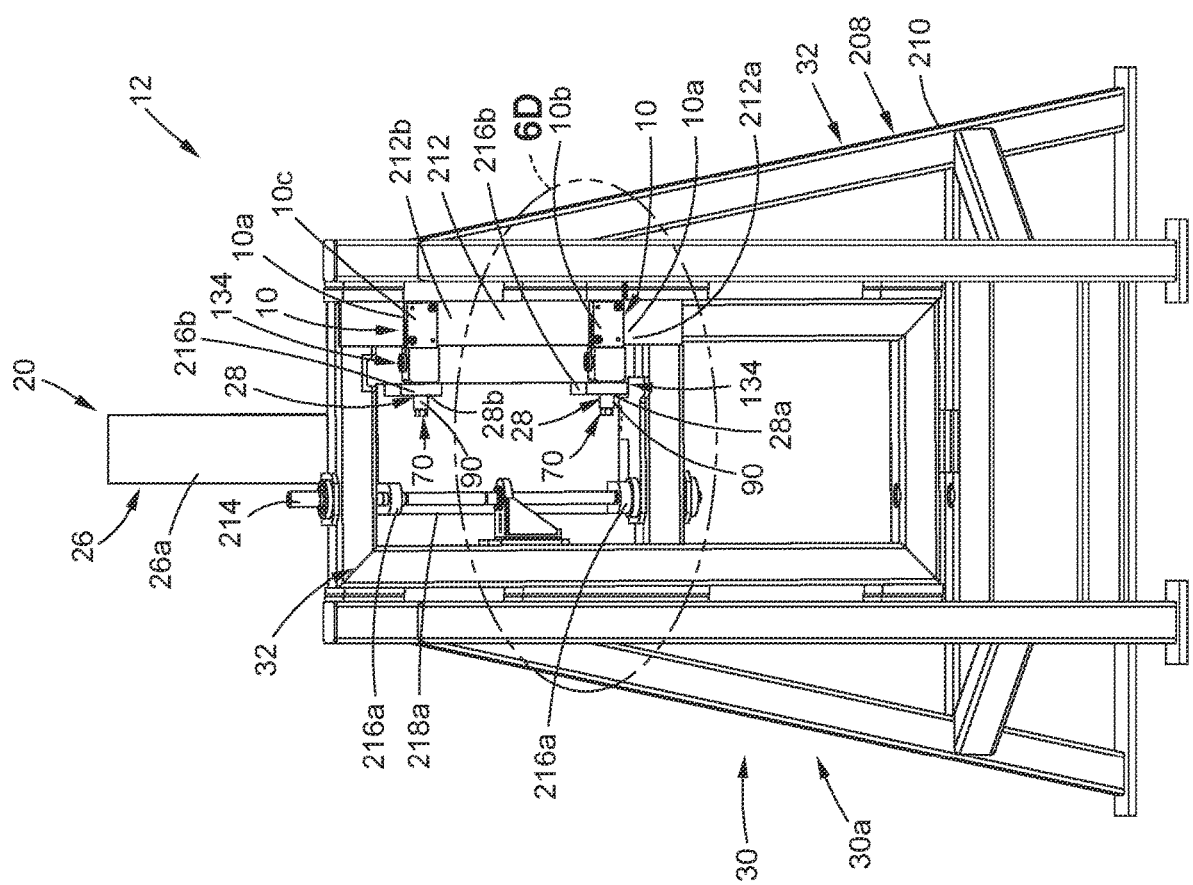
FIG. 6C is an illustration of a right side view of the support system of FIG. 6A, showing two support pin assemblies providing a clocking feature of the assembly jig.
Figure 6D:
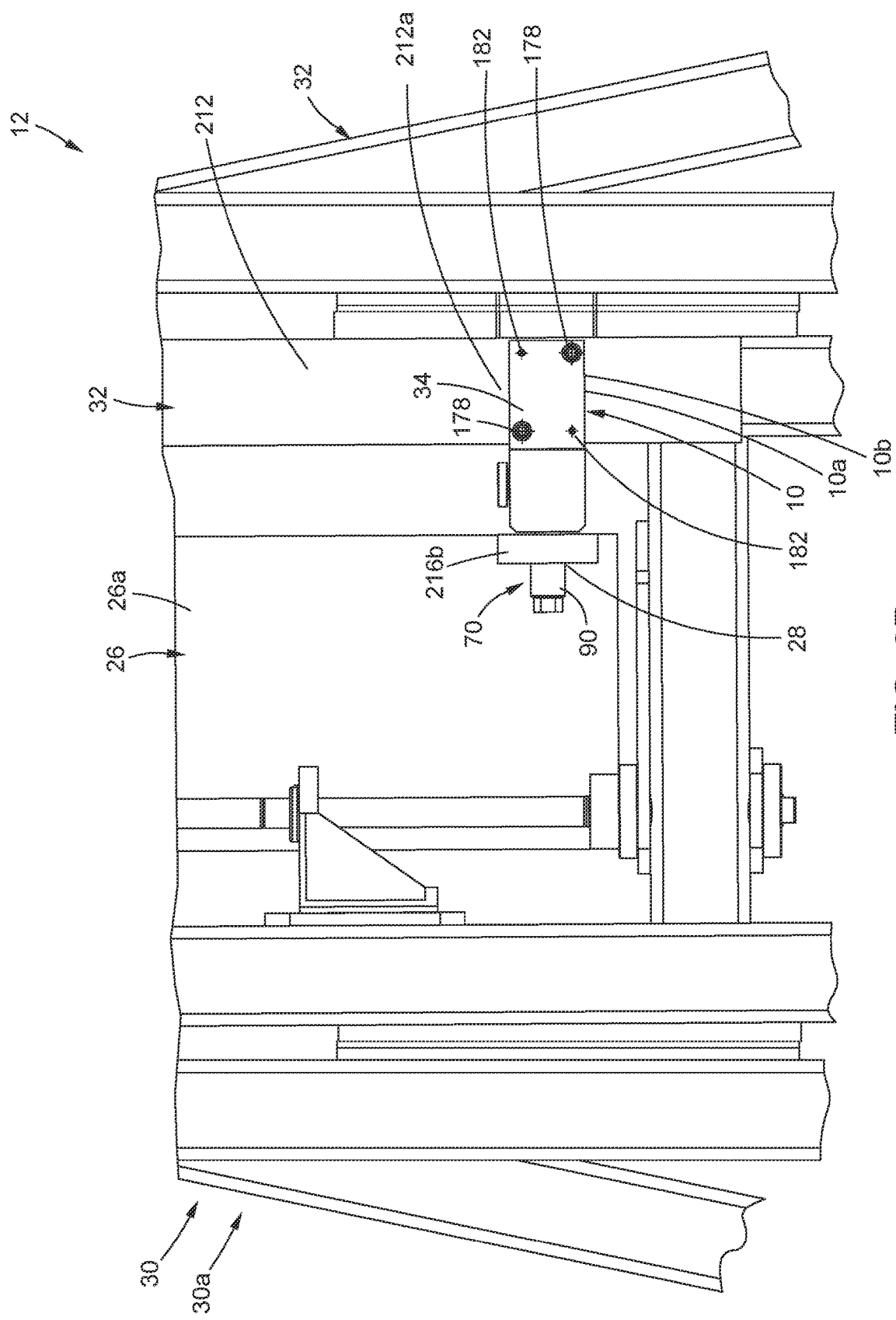
FIG. 6D is an illustration of an enlarged right side view of the support pin assembly, the frame section, the assembly jig, and the fixture of circle 6D of FIG. 6C.
Figure 6E:
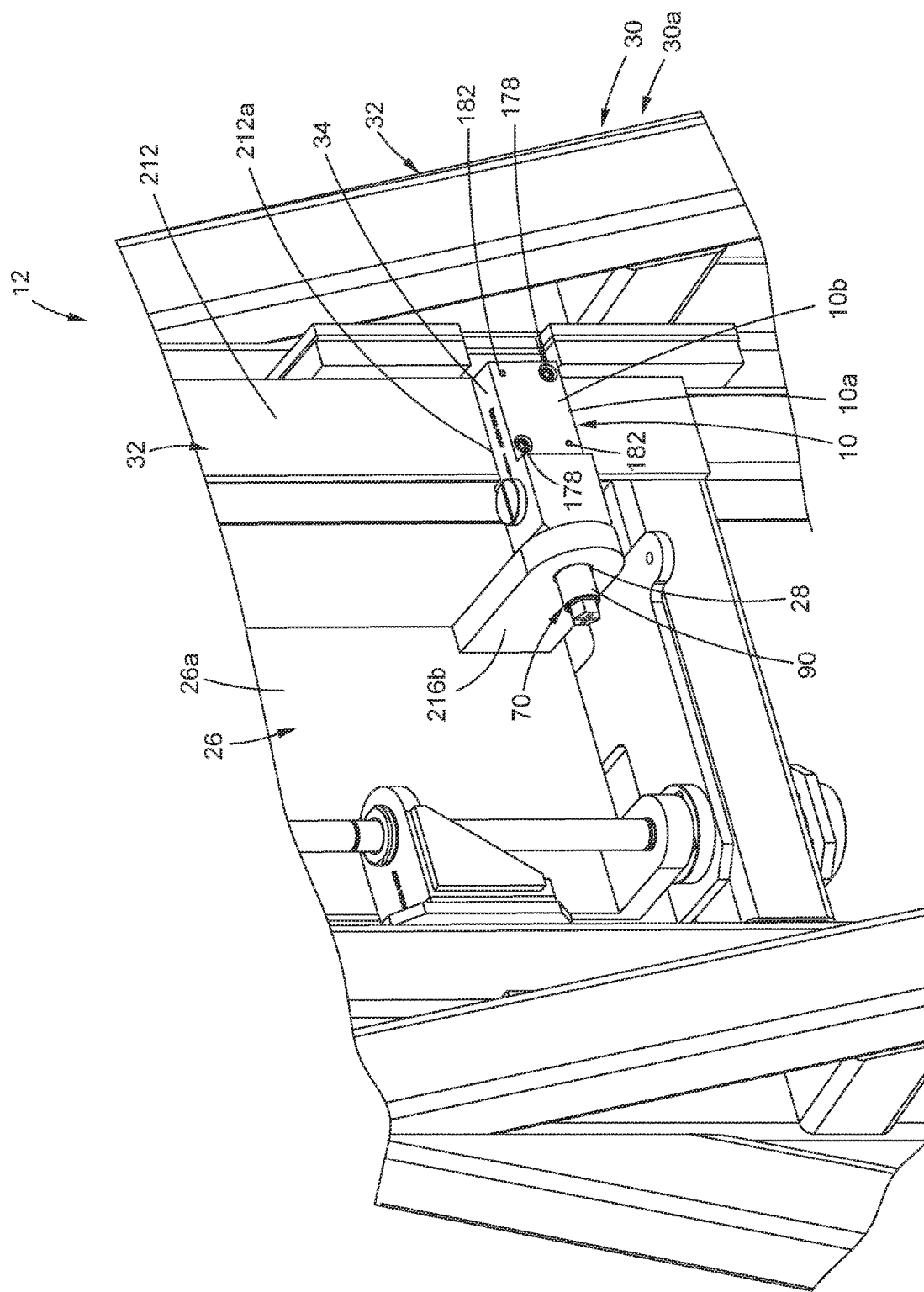
FIG. 6E is an illustration of an enlarged right side perspective view of the support pin assembly, the frame section, the assembly jig, and the fixture of FIG. 6D.
Figure 6F:
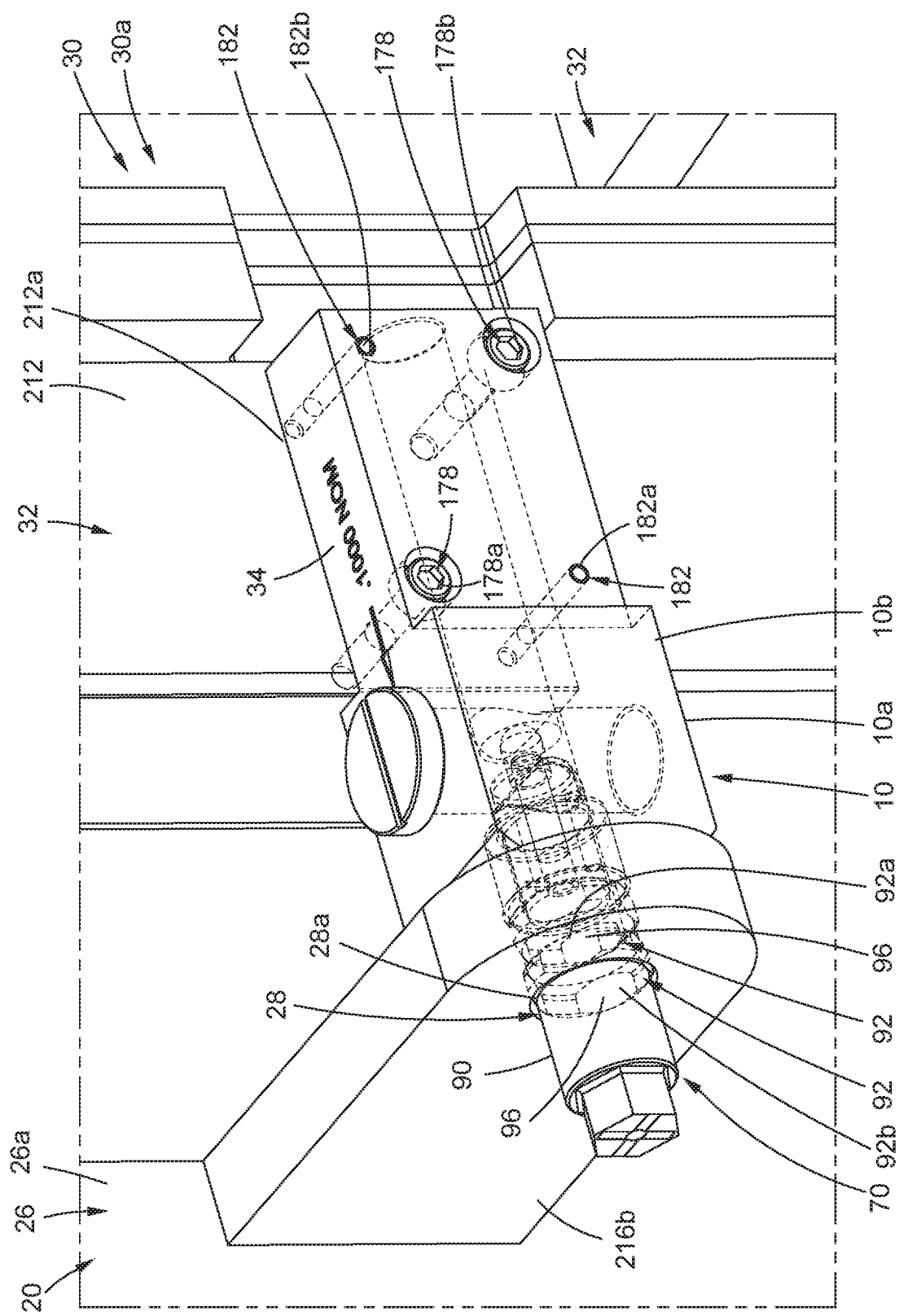
FIG. 6F is an illustration of an enlarged right side perspective view of the support pin assembly, the frame section, and the assembly jig of FIG. 6E, showing exterior and interior parts of the support pin assembly.

The at least one protruding circumferential portion 92 (see FIG. 6F), or preferably, the at least two protruding circumferential portions 92, on the extending portion 90 (see FIG. 6F) of the pin 70 (see FIG. 6F) is/are configured to be positioned within a hole 28 (see FIG. 6F) in a frame section 26 (see FIG. 6F) of the aircraft structure 20 (see FIG. 6F) for the full size determinant assembly 14, and to provide a nominal adjustment 116 (see FIG. 1) such as a pin float 118 (see FIG. 1) of the pin 70 relative to the hole 28, so that with any occurrence 120 (see FIG. 1) of a binding condition 122 (see FIG. 1) of the pin 70 within the hole 28, the pin 70 is configured to be released from the binding condition 122 by rotating the pin 70 via the two or more flat surface portions 96 (see FIG. 6F). As used herein, a "binding condition" means an immovable condition where a pin is not able to move and cannot be removed from an assembly jig.

Thus, the support pin assembly 10, such as the support floating pin assembly 10a, allows for the nominal adjustment 116 or the pin float 118 and a pin release 124 (see FIG. 1) in the event of the binding condition 122 (see FIG. 1) of the pin 70, or pin binding. The nominal adjustment 116 or the pin float 118 allows the pin 70 to slide in and out to allow adjustment movement of the frame section 26 that is being supported during full size determinant assembly 14.

Further, the support pin assembly 10, such as the support floating pin assembly 10a, allows for the build up of the frame section 26 (see FIG. 1), including the wing frame section 26a (see FIG. 1), such as the inner wing frame section 26b (see FIG. 1) and the outer wing frame section 26c (see FIG. 1) without jig lock of the assembly jig 30 (see FIG. 1) or pin binding issues with the pin 70 (see FIG. 1). Thus, the support pin assembly 10, such as the support floating pin assembly 10a, provides a jig lock prevention 126 (see FIG. 1) and a pin binding prevention 128 (see FIG. 1). In addition, the support pin assembly 10, such as the support floating pin assembly 10a, is a custom pin design that can be used in a variety of full size determinant assembly build ups 18 (see FIG. 1) and that accurately positions and supports the frame section 26, such as the wing frame section 26a, for full size determinant assembly 14 (see FIG. 1). The pin 70 is discussed below in further detail with respect to FIGS. 2A-2I and FIGS. 4A-4D.

As further shown in FIG. 1, the support pin assembly 10 provides for nominal offset gaps (NOG) 130, such as a first nominal offset gap (NOG) 130a and a second nominal offset gap (NOG) 130b. One nominal offset gap 130, such as the first nominal offset gap 130a, shown in FIGS. 2F, 2H, 2I, is formed between the top side 54 of the block 34 and the bottom end 60 of the head portion 52 of the barrel nut 48. Another nominal offset gap 130, such as the second nominal offset gap 130a, shown in FIGS. 2C, 2H, 2I, is formed between the first end 40 of the block 34 and a proximal protruding circumferential portion 92a proximal to, or positioned proximal to, the first end 40 of the block 34. The nominal offset gaps 130 are known, predetermined nominal offset gaps, and as shown in FIGS. 2H, 2I, the block 34 is marked with 0.1000 NOM (nominal) indicators 131 at the first nominal offset gap 130a and the second nominal offset gap 130b, which indicates that a feeler gauge 132 (see FIG. 1), such as a 0.1000 feeler gauge, should be able to fit within the nominal offset gap 130, and if it does not, the nominal offset gap 130 is too low or not wide enough, and if a 0.1200 feeler gauge is able to fit within the nominal offset gap 130, the nominal offset gap 130 is too high or too wide.

As further shown in FIG. 1, the support system 12 provides that when the support system 12 comprises one or more support pin assemblies 10 coupled to the engineering part 24, such as the frame section 26 of the aircraft structure 20, the one or more support pin assemblies 10 provide a clocking feature 134 of the assembly jig 30, to orient the frame section 26 of the aircraft structure 20 in a desired orientation 136. As used herein, "clocking" means positioning or locating a part correctly to achieve a desired orientation or a required orientation.

Figure 2B:
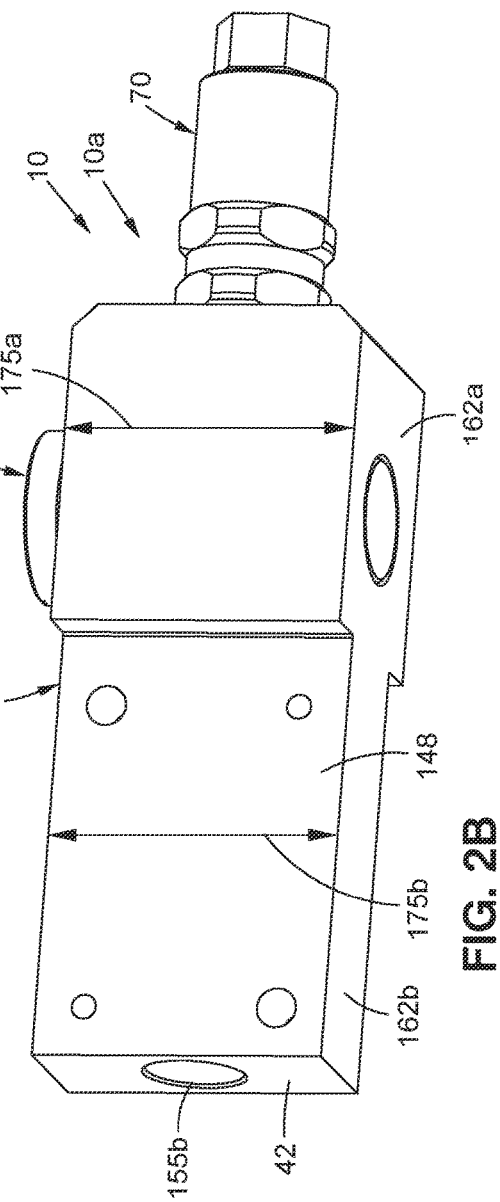
FIG. 2B is an illustration of a left side perspective view of the support pin assembly of FIG. 2A.
Figure 2F:
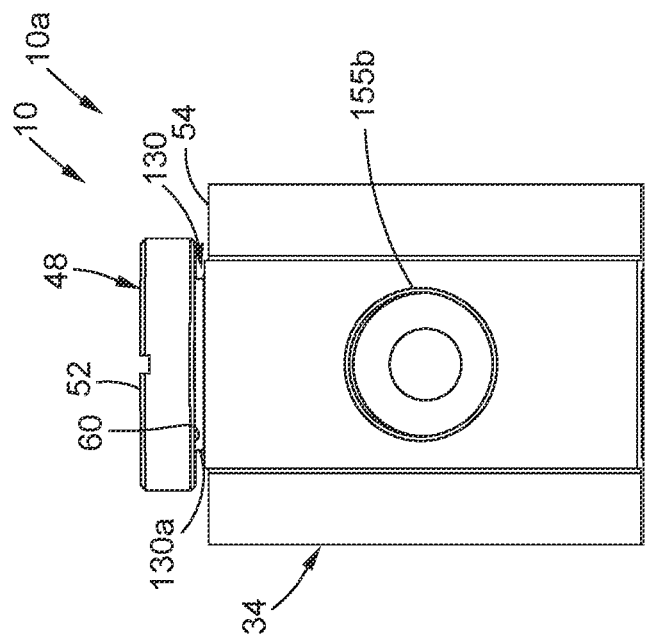
FIG. 2F is an illustration of a back view of the support pin assembly of FIG. 2A.
Figure 2E:
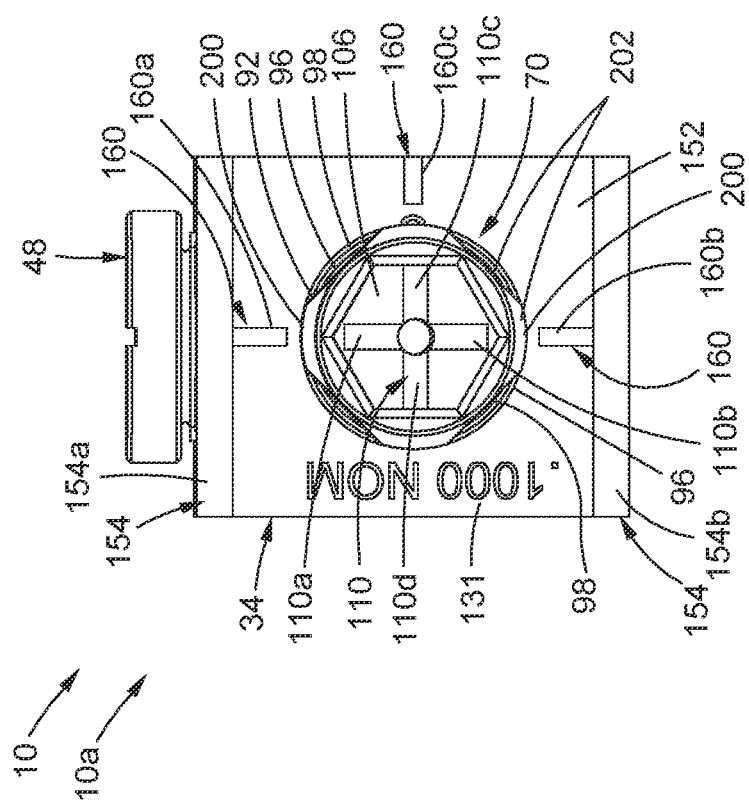
FIG. 2E is an illustration of a front view of the support pin assembly of FIG. 2A.
Figure 2G:
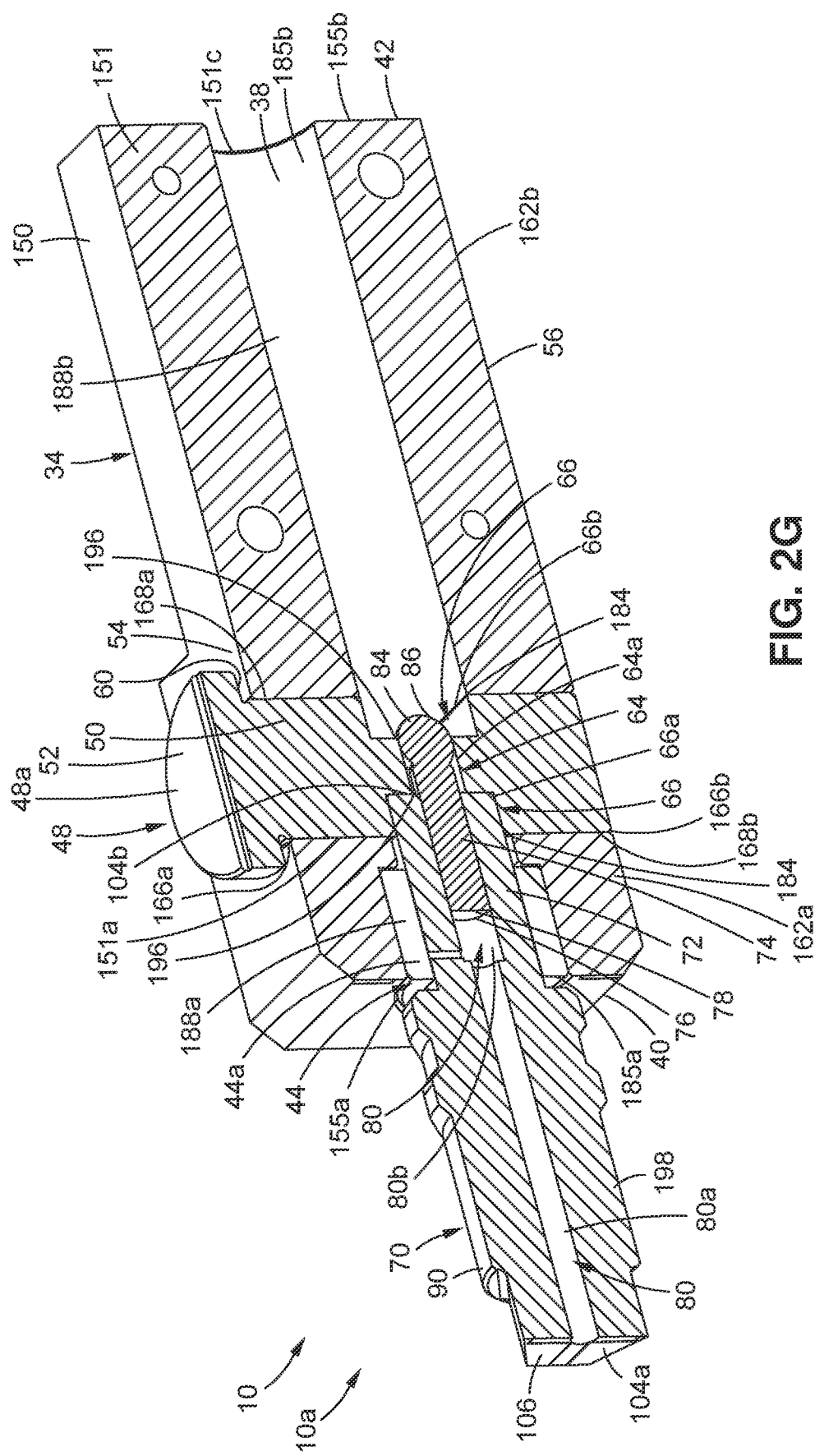
FIG. 2G is an illustration of a cross-sectional view of the support pin assembly of FIG. 2A.
Figure 2H:
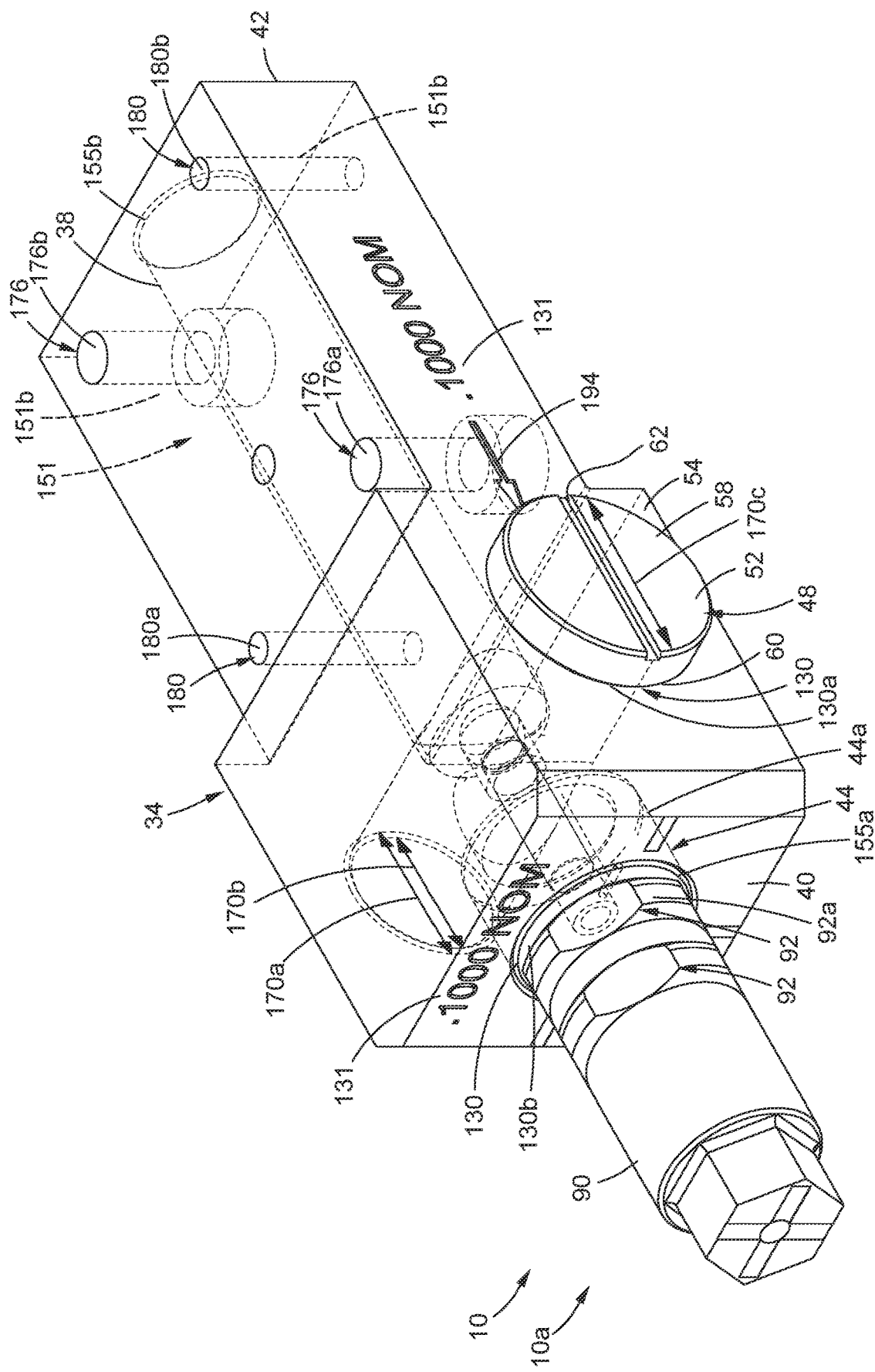
FIG. 2H is an illustration of a top perspective view of the support pin assembly of FIG. 2A, showing exterior and interior parts.

Now referring to FIGS. 2A-2I, FIGS. 2A-2I show exemplary versions of a support pin assembly 10, such as the support floating pin assembly 10a, of the disclosure, in an assembled configuration 140 (see FIGS. 2A, 2I). FIG. 2A is an illustration of a right side perspective view of an exemplary version of the support pin assembly 10, such as the support floating pin assembly 10a, of the disclosure in the assembled configuration 140, showing a pin 70 with two protruding circumferential portions 92. FIG. 2B is an illustration of a left side perspective view of the support pin assembly 10 of FIG. 2A. FIG. 2C is an illustration of a top view of the support pin assembly 10 of FIG. 2A. FIG. 2D is an illustration of a bottom view of the support pin assembly 10 of FIG. 2A. FIG. 2E is an illustration of a front view of the support pin assembly 10 of FIG. 2A. FIG. 2F is an illustration of a back view of the support pin assembly 10 of FIG. 2A. FIG. 2G is an illustration of a cross-sectional view of the support pin assembly 10 of FIG. 2A. FIG. 2H is an illustration of a top perspective view of the support pin assembly 10 of FIG. 2A, showing exterior and interior parts. FIG. 2I is an illustration of a top perspective view of another exemplary version of a support pin assembly 10, such as a support floating pin assembly 10a, of the disclosure, in an assembled configuration 140, showing a pin 70 with one protruding circumferential portion 92.

As shown in FIGS. 2A-2I, the support pin assembly 10, such as the support floating pin assembly 10a, comprises the block 34, the bushing 44 (see FIGS. 2A, 2G, 2H, 2I), the barrel nut 48, and the pin 70 (see FIGS. 2A-2E, 2G, 2H, 2I).

In one version, the block 34 comprises a T-shaped block 34a (see FIGS. 2C-2D) having a T-shaped profile 144 (see FIGS. 2C-2D). In other versions, the block 34 may have another suitable shape. Preferably, the block 34 is a one-piece, unitary, monolithic configuration. However, the block 34 may be made of two or more pieces or parts coupled, or attached, together with a suitable attachment means. A size of the block 34 may be scaled up or down depending on the usage and size of the assembly jig 30. For example, for an assembly jig 30 that is small, the block 34 may be sized down to a couple inches, and for an assembly jig 30 that is large, the block 34 may be sized up to several feet or more. In one version, the block 34 is made of a metal material including steel, stainless steel, aluminum, aluminum alloy, or another suitable metal material. In other versions, the block 34 may be made of nylon, polyoxymethylene (POM) a high-performance acetal homopolymer resin that is durable, stiff, and stable, wood, or another suitable material.

As shown in FIG. 2A, the block 34 comprises the first end 40, or front end, the second end 42, or back end, the top side 54, the bottom side 56, and a right side 146, and as shown in FIG. 2B, the block comprises a left side 148. The block 34 further comprises an exterior 150 (see FIG. 2G) and an interior 151 (see FIG. 2G).

Figure 3:
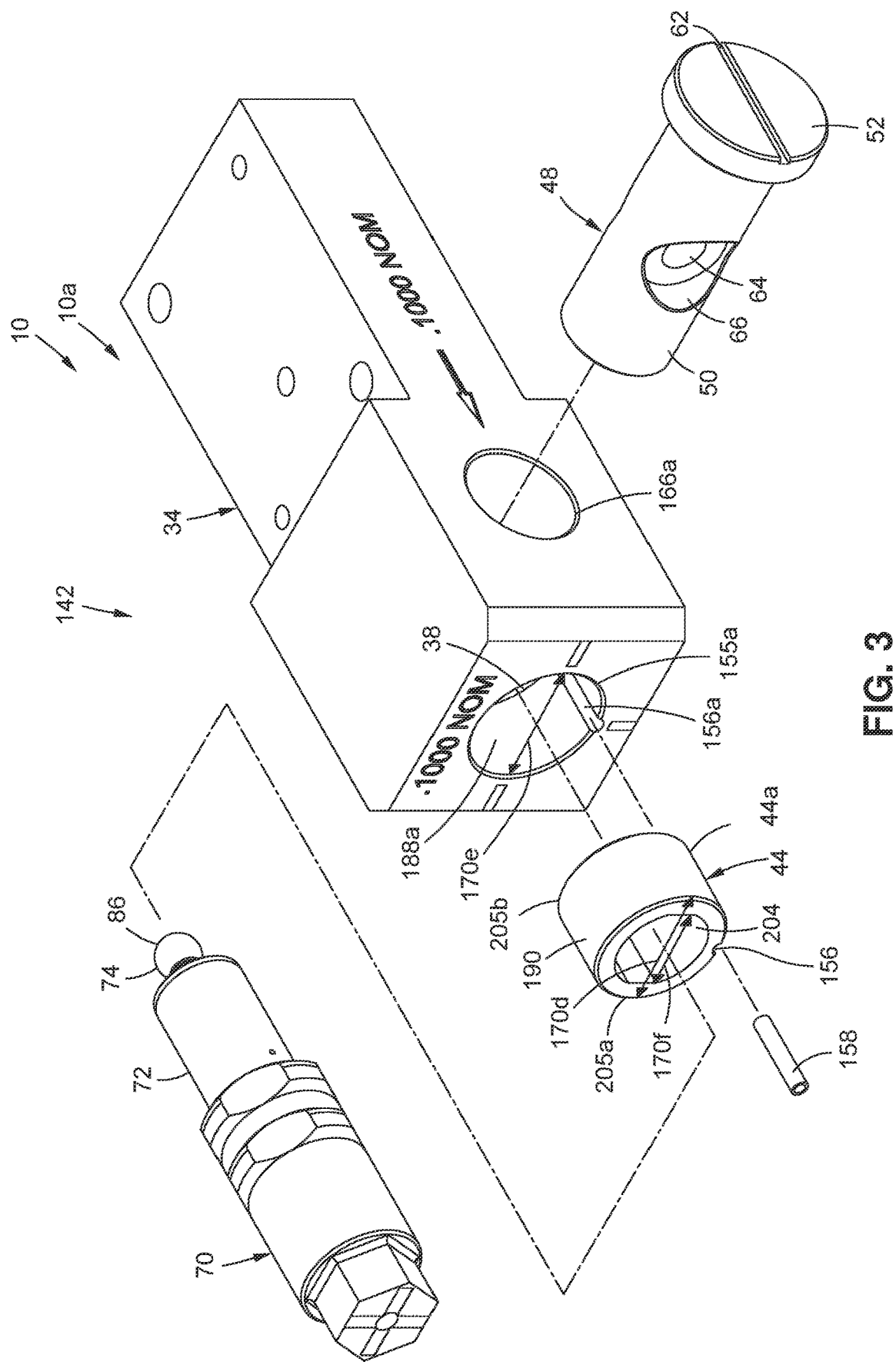
FIG. 3 is an illustration of an exploded view of a top perspective view of an exemplary version of a support pin assembly of the disclosure in an unassembled configuration.

The block 34 further comprises a front face 152 (see FIGS. 2A, 2E) that may be optionally chamfered with chamfered edges 154 (see FIGS. 2A, 2E), including a top chamfered edge 154a (see FIG. 2E) and a bottom chamfered edge 154b (see FIG. 2E). The block 34 further comprises a first opening 155a (see FIGS. 2A, 2G, 2H, 2I), or front opening, at the first end 40 (see FIGS. 2H, 2I) of the block 34 and formed in the front face 152. The block 34 further comprises a second opening 155b (see FIGS. 2B, 2F, 2G, 2H, 2I), or back opening, at the second end 42 of the block 34. The first opening 155a and the second opening 155b are coaxial with the horizontal bore 38 (see FIGS. 2G, 2H, 2I), and in one version, as shown in FIG. 2G, the horizontal bore 38 extends between the first end 40 at the first opening 155a and the second end 42 (see FIGS. 2B, 2H, 2I) at the second opening 155b. The first opening 155a is of a sufficient shape and size to receive and retain the bushing 44 (see FIG. 2G), such as the slotted bushing 44a (see FIG. 2G). As shown in FIGS. 2H, 2I, in one version, the first opening 155a is of a greater size and a greater diameter than a size and a diameter of the second opening 155b. As shown in FIG. 3, the bushing 44, such as the slotted bushing 44a, has a slot 156, and the first opening 155a and the horizontal bore 38 have a slot 156a. The slot 156 and the slot 156a are designed to receive and retain a slotted bushing pin 158 (see FIG. 3) used with the bushing 44, such as the slotted bushing 44a.

As further shown in FIGS. 2A, 2E, the front face 152 of the block 34 has alignment lines 160 marked or indicated on the front face 152. The alignment lines 160 are designed to align with the sight lines 110 on the pin head portion 106 of the pin 70 in order to align the pin 70 with the block 34, the horizontal bore 38, and the barrel nut 48. FIG. 2E shows the front face 152 of the block 34 having three (3) alignment lines 160, including a first alignment line 160a, a second alignment line 160b, and a third alignment line 160c. The first alignment line 160a and the second alignment line 160b are for vertical alignment with the pin 70, and the third alignment line 160c is for horizontal alignment with the pin 70. However, the front face 152 of the block 34 may have greater than three (3) alignment lines 160 or may have two (2) alignment lines 160. As shown in FIGS. 2E, 2H, 2I, the front face 152 further shows the 0.1000 NOM indicator 131 for the nominal offset gap 130 (see FIGS. 2H, 2I), such as the second nominal offset gap 130b (see FIGS. 2H, 2I), formed between the first end 40 of the block 34 and the proximal protruding circumferential portion 92a proximal to the first end 40 of the block 34.

As shown in FIG. 2A, in one version, the block 34 further comprises a block body 162 having a block body first portion 162a integral with a block body second portion 162b. In another version, the block body first portion 162a may be attached to the block body second portion 162b via a suitable attachment means. The block body first portion 162a has a first end 163a (see FIG. 2C) and a second end 163b (see FIG. 2C), and has a generally cube shape 164 (see FIG. 2A). As shown in FIG. 2G, the vertical bore 36 comprising a vertically-aligned bore is vertically formed through the interior 151 of the block 34, and in particular, through an interior portion 151a of the block body first portion 162a. As shown in FIG. 2G, the block body first portion 162a has a top opening 166a and a bottom opening 166b (see also FIGS. 2B, 2D), and the vertical bore 36 has a first end 168a at the top opening 166a and a second end 168b at the bottom opening 166b. The vertical bore 36 is of a sufficient shape and size to accommodate and retain the cylindrical body 50 (see FIG. 2G) of the barrel nut 48 (see FIG. 2G) within the vertical bore 36. The vertical bore 36 is substantially the same cylindrical shape as the cylindrical body 50. As shown in FIG. 2D, the vertical bore 36 has a diameter 170a with a length that is slightly longer and greater than a length of a diameter 170b of the cylindrical body 50 of the barrel nut 48, so that the outer walls of the cylindrical body 50 fit snugly within the inner walls of the vertical bore 36.

As shown in FIG. 2C, the block body second portion 162b has a first end 171a and a second end 171b, and has a generally box shape 172 and extends horizontally from the second end 163b of the block body first portion 162a. The block body first portion 162a has a width 174a (see FIG. 2D) and a height 175a (see FIG. 2B), and the block body second portion 162a has a width 174b (see FIG. 2D) and a height 175b (see FIG. 2B). In one version, as shown in FIG. 2D, the width 174a of the block body first portion 162a is greater than the width 174b of the block body second portion 162b. However, in other versions, the width 174a of the block body first portion 162a may be less than the width 174b of the block body second portion 162b, or the width 174a of the block body first portion 162a may be equal to the width 174b of the block body second portion 162b. In one version, as shown in FIG. 2B, the height 175a of the block body first portion 162a is equal to, or the same as, the height 175b of the block body second portion 162b. However, in other versions, the height 175a of the block body first portion 162a may be greater than, or less than, the height 175b of the block body second portion 162b. The dimensions of the block 34 are relative to the requirements of the full size determinant assembly build process 16 (see FIG. 1).

As shown in FIGS. 2A, 2H, 2I, the block body second portion 162b has bolt holes 176, including a first bolt hole 176a and a second bolt hole 176b, formed through the block body second portion 162b. Each bolt hole 176 is designed to receive a bolt 178 (see FIG. 6F), or another suitable attachment element, for coupling or attaching the block 34 to the assembly jig 30 (see FIG. 6F). As shown in FIG. 6F, the bolts 178 comprise a first bolt 178a and a second bolt 178b. FIGS. 2H, 2I shows two bolt holes 176 formed through the interior 151 of the block 34, and in particular, through interior portions 151b, of the block body second portion 162b. However, the block body second portion 162b may have more than two bolt holes 176, and/or the block body first portion 162a may have bolt holes 176.

As further shown in FIGS. 2A, 2H, 2I, in one version, the block body second portion 162b has dowel holes 180, including a first dowel hole 180a and a second dowel hole 180b formed through the block body second portion 162b. Each dowel hole 180 is designed to receive a dowel 182 (see FIG. 6F), or another suitable attachment element, for coupling or attaching the block 34 to the assembly jig 30 (see FIG. 6F). The dowel 182 or dowels 182 are a more precise means of locating two details together, and are more accurate locators than the bolts 178. The bolts 178 provide the clamping mechanism to keep the two details together. As shown in FIG. 6F, the dowels 182 comprise a first dowel 182a and a second dowel 182b. FIGS. 2H, 2I show two dowel holes 180 formed through the interior 151 of the block 34, and in particular, through interior portions 151b of the block body second portion 162b. However, the block body second portion 162b may have more than two dowel holes 180, and/or the block body first portion 162a may have dowel holes 180. Optionally, in another version, the block body second portion 162b does not have dowel holes 180 and does not use dowels 182, for example, if the block 34 is not required to be precision set for the production process.

As shown in FIG. 2G, the block 34 comprises the horizontal bore 38 formed through the interior 151 of the block 34, and in particular, through a center interior 151c of the block 34, including through the block body first portion 162a and through the block body second portion 162b. As shown in FIG. 2G, the horizontal bore 38 extends horizontally from the first end 40 of the block 34 to the second end 42 of the block 34. As shown in FIG. 2G, the horizontal bore 38 intersects the vertical bore 36 at intersections 184. As further shown in FIG. 2G, the horizontal bore 38 comprises a first end 185a at the first opening 155a of the block 34 and comprises a second end 185b at the second opening 155b of the block 34. The horizontal bore 38 has a horizontal bore first portion 188a (see FIG. 2G) continuous with a horizontal bore second portion 188b (see FIG. 2G). As shown in FIG. 2G, in one version, the diameter and the size of the horizontal bore first portion 188a is greater than the diameter and the size of the horizontal bore second portion 188b. However, in other versions, the diameter and the size of the horizontal bore first portion 188a may be less than, or equal to, the diameter and the size of the horizontal bore second portion 188b.

As shown in FIGS. 2G, 2H, 2I, 3, the support pin assembly 10, such as the support floating pin assembly 10a, further comprises the bushing 44, such as the slotted bushing 44a, configured to be disposed within, and disposed within, the horizontal bore 38 at the first end 40 of the block 34, and in particular, within the horizontal bore first portion 188a (see FIG. 2G). In one version, the bushing 44 is formed of a metal material including steel, stainless steel, aluminum, aluminum alloy, or another suitable metal material. In other versions, the bushing 44 may be made of nylon, polyoxymethylene (POM) a high-performance acetal homopolymer resin that is durable, stiff, and stable, wood, or another suitable material.

The horizontal bore first portion 188a is of a sufficient shape and size to accommodate and retain the bushing 44, such as the slotted bushing 44a, and the slotted bushing pin 158 (see FIG. 3), also referred to as a roll pin, within the interior of the horizontal bore first portion 188a. The horizontal bore first portion 188a is substantially the same cylindrical shape as a bushing cylindrical body 190 (see FIG. 3) of the bushing 44 (see FIG. 3), such as the slotted bushing 44a (see FIG. 3). As shown in FIG. 2G, the size of the horizontal bore first portion 188a is of a sufficient and effective size to accommodate the size of the bushing 44, such as the slotted bushing 44a, so that the outer walls of the bushing 44 fit snugly within the inner walls of the horizontal bore first portion 188a. The bushing 44, such as the slotted bushing 44a, is preferably press fit within, and horizontally aligned within, the horizontal bore first portion 188a of the horizontal bore 38 in a press fit insertion 46a (see FIG. 1).

As shown in FIGS. 2A-2I, the support pin assembly 10, such as the support floating pin assembly 10a, further comprises the barrel nut 48. As shown in FIGS. 2G, 5A, the barrel nut 48 comprises the cylindrical body 50 and the head portion 52 integral with the cylindrical body 50. A size of the barrel nut 48 may be scaled up or down depending on the usage and size of the assembly jig 30. For example, for an assembly jig 30 that is small, the barrel nut 48 may be sized down to a couple inches, and for an assembly jig 30 that is large, the barrel nut 48 may be sized up to several feet or more. In one version, the barrel nut 48 is made of a metal material including steel, stainless steel, zinc plated steel, aluminum, aluminum alloy, brass, or another suitable metal material. In other versions, the barrel nut 48 may be made of nylon, polyoxymethylene (POM) a high-performance acetal homopolymer resin that is durable, stiff, and stable, wood, another suitable material.

As shown in FIG. 2G, the cylindrical body 50 is disposed within the vertical bore 36, and the cylindrical body 50 and the vertical bore 36 both extend between the top side 54 of the block 34 and the bottom side 56 of the block 34. In another version, the barrel nut 48 may comprise the cylindrical body 50 without the head portion 52. As further shown in FIG. 2G, the head portion 52 extends from the cylindrical body 50 exterior to the vertical bore 36 at the top side 54 of the block 34, and the head portion 52 has the top end 58 and the bottom end 60. As shown in FIG. 5A, the cylindrical body 50 of the barrel nut 48 comprises a first end 192a, or top end, and a second end 192b, or bottom end.

As shown in FIGS. 2F, 2H, 2I, the nominal offset gap 130, such as the first nominal offset gap 130a, is formed between the top side 54 of the block 34 and the bottom end 60 of the head portion 52 of the barrel nut 48. FIGS. 2H, 2I shows the 0.1000 NOM indicator 131 with an arrow 194 pointing at the first nominal offset gap 130a.

As shown in FIGS. 2A, 2H, 2I, the barrel nut 48 further comprises the alignment slot 62 formed in the top end 58 of the head portion 52. Alternatively, if there is no head portion 52, the alignment slot 62 may be formed in the first end 192a (see FIG. 5A), or top end, of the cylindrical body 50. The alignment slot 62 is visible to enable alignment of the barrel nut hole 64 (see FIGS. 2G, 2H, 2I) of the barrel nut 48 with the horizontal bore 38. As shown in FIGS. 2H, 2I, in one version, the alignment slot 62 has a length equal to a length of a diameter 170c of the head portion 52 of the barrel nut 48. In other versions, the alignment slot 62 may have another suitable length. In one version, as shown in FIGS. 2H, 2I, the diameter 170c of the head portion 52 is longer than the diameter 170b of the cylindrical body 50 and is longer than the diameter 170a of the vertical bore 36.

As shown in FIG. 2G, the cylindrical body 50 of the barrel nut 48 comprises the barrel nut hole 64, such as the unthreaded barrel nut hole 64a, and the counterbores 66, including the first counterbore 66a and the second counterbore 66b, extending transversely through the cylindrical body 50 of the barrel nut 48. In one version, as shown in FIG. 2G, the barrel nut 48 comprises the symmetric barrel nut 48a, with the counterbores 66, such as the first counterbore 66a and the second counterbore 66b, on both sides 196 of the barrel nut hole 64. The barrel nut hole 64 and the counterbore 66, or counterbores 66, are aligned with the horizontal bore 38 of the block 34 and are in coaxial alignment 68 (see FIG. 1) with the horizontal bore 38 of the block 34.

As shown in FIGS. 2A-2I, the support pin assembly 10, such as the support floating pin assembly 10a, further comprises the pin 70, such as the floating pin 70a. The pin 70 has the first end 104a (see FIG. 2G, 4A) comprising the pin head portion 106 (see FIGS. 2G, 4A) and the second end 104b (see FIGS. 2G, 4A). A size of the pin 70 may be scaled up or down depending on the usage and size of the assembly jig 30. For example, for an assembly jig 30 that is small, the pin 70 may be sized down to a couple inches, and for an assembly jig 30 that is large, the pin 70 may be sized up to several feet or more. In one version, the pin 70 is formed of a metal material including steel, stainless steel, aluminum, aluminum alloy, or another suitable metal material. In other versions, the pin 70 may be made of nylon, polyoxymethylene (POM) a high-performance acetal homopolymer resin that is durable, stiff, and stable, wood, another suitable material.

As shown in FIGS. 2A, 2E, the pin head portion 106 has the outer surface 108 indicated or marked with sight lines 110 for visual inspection 112 (see FIG. 1) of pin alignment 114 (see FIG. 1) of the pin 70 relative to the block 34. As shown in FIG. 2E, the sight lines 110 include a first sight line 110a, a second sight line 110b opposite the first sight line 110a, a third sight line 110c, and a fourth sight line 110d opposite the third sight line 110c. As shown in FIG. 2E, the first sight line 110a is aligned with the first alignment line 160a on the front face 152, the second sight line 110b is aligned with the second alignment line 160b on the front face 152, and the third sight line 110c is aligned with the third alignment line 160c on the front face 152.

As shown in FIGS. 2G, 4A-4B, 4D, the pin 70 has a pin body 198 with the interior bore 80 (see FIGS. 2G, 4B) formed through the pin body 198 from the first end 104a to the second end 104b. As shown in FIGS. 2G, 4B, the interior bore 80 comprises an interior bore first portion 80a formed within the extending portion 90 of the pin body 198 of the pin 70 and partially within the insertion portion 72, and further comprises an interior bore second portion 80b formed within the insertion portion 72.

The pin 70 comprises the insertion portion 72 (see FIGS. 2G, 4A-4B, 4D) of the pin body 198 configured to be disposed within, and in the assembled configuration 140 (see FIG. 2A) disposed within, the bushing 44 (see FIG. 2G) and the counterbore 66 (see FIG. 2G), such as the first counterbore 66a (see FIG. 2G).

The pin 70 further comprises the extending portion 90 (see FIGS. 2A-2C, 2G, 2H, 2I, 4A-4B, 4D) of the pin body 198, extending from, and exterior to, the first end 40 of the block 34 in the assembled configuration 140 (see FIG. 2A). In one version, as shown in FIGS. 2I, 4D, the extending portion 90 has one protruding circumferential portion 92 formed on the exterior 94 of the extending portion 90. As shown in FIG. 2I, the protruding circumferential portion 92 comprises a proximal protruding circumferential portion 92a proximal to the first end 40 of the block 34.

In another version, as shown in FIGS. 2A-2C, 2H, 4A, the extending portion 90 has two protruding circumferential portions 92 formed on the exterior 94 (see FIG. 2A) of the extending portion 90. As shown in FIG. 2C, the two protruding circumferential portions 92 comprise the proximal protruding circumferential portion 92a proximal to the first end 40 of the block 34 and a distal protruding circumferential portion 92b distal to, or positioned distal to, the first end 40 of the block 34.

As shown in FIG. 4A, with the version of the pin 70 having two protruding circumferential portions 92 comprising the proximal protruding circumferential portion 92a configured to be positioned proximal to the first end 40 (see FIG. 2H) of the block 34 (see FIG. 2H) and the distal protruding circumferential portion 92b configured to be positioned distal to the first end 40 (see FIG. 2H) of the block 34 (see FIG. 2H), the distal protruding circumferential portion 92b has an outer diameter 170g and the proximal protruding circumferential portion 92a has an outer diameter 170h. In one version, as shown in FIG. 4A, the outer diameter 170g of the distal protruding circumferential portion 92b is greater, such as slightly greater, in length or size than a length or size of the outer diameter 170h of the proximal protruding circumferential portion 92a. For example, in one version, the length or size of the outer diameter 170g of the distal protruding circumferential portion 92b is 1.5615 inches, and the length or size of the outer diameter 170h of the proximal protruding circumferential portion 92a is 1.5575 inches. When the two protruding circumferential portions 92 have slightly different length outer diameters 170g, 170h, the proximal protruding circumferential portion 92a has the smaller outer diameter 170h, as compared to the distal protruding circumferential portion 92b that has the larger outer diameter 170g. The slightly different length outer diameters 170g, 170h, act as a step pin to get a full size determinant assembly build up 18 (see FIG. 1) with a tighter tolerance, as each protruding circumferential portion 92 is engaged. For example, a good frame section 26 within allowable tolerances can be made with just the proximal protruding circumferential portion 92a engaged within the hole 28 (see FIGS. 1, 6F) of the frame section 26 (see FIGS. 1, 6F), and an even better frame section 26 closer to perfect tolerances can be made with both the distal protruding circumferential portion 92b and the proximal protruding circumferential portion 92a engaged within the hole 28 (see FIGS. 1, 6F) of the frame section 26 (see FIGS. 1, 6F).

In another version, the outer diameter 170g of the distal protruding circumferential portion 92b is equal in length or size to the length or size of the outer diameter 170h of the proximal protruding circumferential portion 92a.

Each protruding circumferential portion 92 has two or more flat surface portions 96 (see FIGS. 2A, 2D, 2E, 4A, 4D), also referred to as "flats", machined or formed on opposing sides 98 (see FIG. 2E) of the protruding circumferential portion 92, to enable the rotation 100 (see FIG. 1) of the pin 70, and in particular, to enable rotation 100 of the pin head portion 106 (see FIGS. 4A, 4D), by a tool 102 (see FIG. 1), such as a wrench or another suitable tool, or manually by hand by a user, depending on the binding condition 122 (see FIG. 1) of the pin 70. Each protruding circumferential portion 92 further comprises two or more radius portions 200 (see FIGS. 2A, 2D, 2E, 4A, 4D), where each radius portion 200 is formed between two flat surface portions 96. Preferably, there is an alternating configuration 202 (see FIGS. 2E, 4A, 4D) between the flat surface portions 96 and the radius portions 200, such that one flat surface portion 96 is between two radius portions 200 and one radius portion 200 is between two flat surface portions 96 around each protruding circumferential portion 92.

FIGS. 2C, 2H, 2I further shown the nominal offset gap 130, such as the second nominal offset gap 130a, formed between the first end 40 of the block 34 and the proximal protruding circumferential portion 92a proximal to the first end 40 of the block 34. FIG. 2C shows the 0.1000 NOM indicator 131 near the second nominal offset gap 130b.

The at least one protruding circumferential portion 92, and preferably the two protruding circumferential portions 92, on the extending portion 90 of the pin 70 are configured to be positioned within the hole 28 (see FIG. 6F) in the frame section 26 (see FIG. 6F) of the aircraft structure 20 (see FIG. 6F) for the full size determinant assembly 14 (see FIG. 1), and configured to provide the nominal adjustment 116 (see FIG. 1), such as the pin float 118 (see FIG. 1), of the pin 70 relative to the hole 28, so that with any occurrence 120 (see FIG. 1) of the binding condition 122 (see FIG. 1) of the pin 70 within the hole 28, the pin 70 is configured to be released from the binding condition 122 by rotating the pin 70 via the two or more flat surface portions 96.

As discussed above, as shown in FIG. 1, the rotation 100 of the pin 70 comprises the quarter turn rotation 100a or the half turn rotation 100b, or another suitable rotation. When each protruding circumferential portion 92 of the at least one protruding circumferential portion 92 has four flat surface portions 96, the quarter turn rotation 100a of the pin 70 is enabled. When each protruding circumferential portion 92 of the at least one protruding circumferential portion 92 has two flat surface portions 96, the half turn rotation 100b of the pin 70 is enabled.

The pin 70 further comprises the interface element 74 (see FIGS. 2G, 4A-4B, 4D). The interface element 74 has the interface element first end 76 (see FIGS. 2G, 4B), comprising the shaft end 78 (see FIGS. 2G, 4B), disposed or press fit within the interior bore 80 (see FIGS. 2G, 4B) of the pin 70, and in particular, within the interior bore second portion 80b (see FIGS. 2G, 4B) within the insertion portion 72, such as by press fit insertion 46b (see FIG. 1). The interface element 74 further has the interface element second end 84 (see FIGS. 2G, 4B, 4C), comprising the sphere end 86 (see FIGS. 2G, 4B, 4C), disposed or slip fit within the barrel nut hole 64 (see FIG. 4C), such as by the slip fit insertion 88 (see FIG. 1). As shown in FIGS. 4B-4C, the interface element 74 further comprises a shaft 206 formed between the shaft end 78 and the sphere end 86.

Now referring to FIG. 3, FIG. 3 is an illustration of an exploded view of a top perspective view of an exemplary version of the support pin assembly 10, such as the support floating pin assembly 10a, of the disclosure in an unassembled configuration 142. FIG. 3 shows the block 34, the bushing 44, such as the slotted bushing 44a, the slotted bushing pin 158, the barrel nut 48, and the pin 70. As shown in FIG. 3, the block 34 comprises the top opening 166a configured to receive the cylindrical body 50 of the barrel nut 48. As further shown in FIG. 3, the block 34 comprises the first opening 155a, or front opening, and the horizontal bore first portion 188a of the horizontal bore 38 configured to receive and retain the bushing 44. As further shown in FIG. 3, the bushing 44, such as the slotted bushing 44a, has the slot 156, and the first opening 155a and the horizontal bore first portion 188a of the horizontal bore 38 have the slot 156a. The slot 156 and the slot 156a are configured to receive and retain the slotted bushing pin 158 (see FIG. 3) used with the bushing 44, such as the slotted bushing 44a.

As shown in FIG. 3, the barrel nut 48 comprises the head portion 52 with the alignment slot 62 and the cylindrical body 50 with the barrel nut hole 64 and the counterbore 66 transversely extending through the cylindrical body 50. The barrel nut hole 64 is configured for alignment with the horizontal bore 38 (see FIG. 3) and the sphere end 86 (see FIG. 3) of the interface element 74 (see FIG. 3).

As shown in FIG. 3, the bushing 44, such as the slotted bushing 44a, comprises the bushing cylindrical body 190 with a through opening 204 formed from a first end 205a of the bushing 44 to a second end 205b of the bushing. An outer diameter 170d (see FIG. 3) of the bushing 44, such as the slotted bushing 44a, has a length that is less than a diameter 170e (see FIG. 3) of the first opening 155a. The through opening 204 of the bushing 44 is configured to receive the insertion portion 72 (see FIG. 3) of the pin 70 and the interface element 74 coupled to the insertion portion 72. As shown in FIG. 3, the bushing 44, such as the slotted bushing 44a, further has the inner diameter 170f.

Now referring to FIGS. 4A-4D, FIGS. 4A-4D show exemplary versions of the pin 70, such as the floating pin 70a, that is used in the support pin assembly 10 of the disclosure. FIG. 4A is an illustration of a right side perspective view of an exemplary version of the pin 70 that is used in the support pin assembly 10 of the disclosure, where the pin 70 has two protruding circumferential portions 92. FIG. 4B is an illustration of a cross-sectional view of the pin 70 of FIG. 4A, taken along lines 4B-4B of FIG. 4A. FIG. 4C is an illustration of a cross-sectional view of the pin 70 of FIG. 4A, where the pin 70 is coupled to the barrel nut 48. FIG. 4D is an illustration of a right side perspective view of another exemplary version of the pin 70, where the pin 70 has one protruding circumferential portion 92.

FIGS. 4A-4D show the first end 104a, such as the pin head portion 106, the second end 104b, and the pin body 198 with the extending portion 90 and the insertion portion 72, and the interface element 74 coupled to the insertion portion 72. FIG. 4A shows two protruding circumferential portions 92, each with the flat surface portions 96 and the radius portions 200. As shown in FIG. 4A, and as discussed above, with the version of the pin 70 having two protruding circumferential portions 92 comprising the proximal protruding circumferential portion 92a configured to be positioned proximal to the first end 40 (see FIG. 2H) of the block 34 (see FIG. 2H) and the distal protruding circumferential portion 92b configured to be positioned distal to the first end 40 (see FIG. 2H) of the block 34 (see FIG. 2H), the distal protruding circumferential portion 92b has the outer diameter 170g and the proximal protruding circumferential portion 92a has the outer diameter 170h. In one version, as shown in FIG. 4A, the outer diameter 170g of the distal protruding circumferential portion 92b is greater, such as slightly greater, in length or size than a length or size of the outer diameter 170h of the proximal protruding circumferential portion 92a.

FIG. 4D shows one protruding circumferential portion 92 with the flat surface portions 96 and the radius portions 200. FIGS. 4A, 4D further show the interface element second end 84, such as the sphere end 86, of the interface element 74.

FIG. 4B shows the interior bore 80 formed through the pin body 198 from the first end 104a to the second end 104b, including the interior bore first portion 80a formed within the extending portion 90 and partially within the insertion portion 72 of the pin body 198 of the pin 70, and further comprises an interior bore second portion 80b formed within the insertion portion 72. FIG. 4B further shows interface element first end 76, such as the shaft end 78, of the interface element 74 press fit within the interior bore second portion 80b formed within the insertion portion 72. FIG. 4B further shows the interface element second end 84, such as the sphere end 86, of the interface element 74.

FIG. 4C shows the second end 104b of the pin 70 at the insertion portion 72 coupled in and to the first counterbore 66a of the barrel nut 48. FIG. 4C further shows a portion of the shaft 206 of the interface element 74 inserted through the first counterbore 66a and through the barrel nut hole 64. FIG. 4C further shows the sphere end 86 of the interface element 74 coupled to, and slip fit within, the barrel nut hole 64 of the barrel nut 48 and partially within the second counterbore 66b of the barrel nut 48.

Now referring to FIGS. 5A-5B, FIGS. 5A-5B show an exemplary version of the barrel nut 48, such as the symmetric barrel nut 48a, that is used in the support pin assembly 10 of the disclosure. FIG. 5A is an illustration of a front view of an exemplary version of the barrel nut 48. FIG. 5B is an illustration of a cross-sectional view of the barrel nut 48 of FIG. 5A, taken along lines 5B-5B of FIG. 5A.

FIG. 5A shows the cylindrical body 50 and the head portion 52 integral with the cylindrical body 50. As shown in FIG. 5A, the cylindrical body 50 has the first end 192a, the second end 192b, and the barrel nut hole 64, such as the unthreaded barrel nut hole 64a, and the counterbore 66 extending transversely through the cylindrical body 50 of the barrel nut 48. As further shown in FIG. 5A, the head portion 52 comprises the top end 58 with the alignment slot 62 formed in the top end 58, and the bottom end 60. As further shown in FIG. 5A, the barrel nut 48 has a first end 82a and second end 82b.

FIG. 5B shows the barrel nut 48, such as the symmetric barrel nut 48a. FIG. 5B shows the barrel nut hole 64, such as the unthreaded barrel nut hole 64a, and the counterbores 66, such as the first counterbore 66a and the second counterbore 66b, on both sides 196 of barrel nut hole 64, and extending transversely through the cylindrical body 50 of the barrel nut 48.

Now referring to FIGS. 6A-6F, FIGS. 6A-6F shows an exemplary version of a support system 12 of the disclosure with one or more support pin assemblies 10, such as one or more support floating pin assemblies 10a, of the disclosure. FIG. 6A is an illustration of a right side perspective view of the exemplary version of the support system 12 of the disclosure with the support pin assembly 10, such as the support floating pin assembly 10a, of the disclosure, showing an exemplary version of a frame section 26, such as a wing frame section 26a, of an aircraft structure 20, and an exemplary version of an assembly jig 30. FIG. 6B is an illustration of a front perspective view of the support system 12 of FIG. 6A, showing an exemplary version of the frame section 26, such as the wing frame section 26a, of the aircraft structure 20 and the exemplary version of an assembly jig 30. FIG. 6C is an illustration of a right side view of the support system 12 of FIG. 6A, showing, in one version, two support pin assemblies 10 providing the clocking feature 134 of the assembly jig 30. FIG. 6D is an illustration of an enlarged right side view of the support pin assembly 10, the frame section 26, the assembly jig 30, and the fixture 32 of circle 6D of FIG. 6C. FIG. 6E is an illustration of an enlarged right side perspective view of the support pin assembly 10, the frame section 26, the assembly jig 30, and the fixture 32 of FIG. 6D. FIG. 6F is an illustration of an enlarged right side perspective view of the support pin assembly 10, the frame section 26, and the assembly jig 30 of FIG. 6E, showing exterior and interior parts of the support pin assembly 10.

As shown in FIGS. 6A-6E, the assembly jig 30 comprises a wing assembly jig 30a comprising fixtures 32, or fixture assemblies, and the frame section 26 of the aircraft structure 20 comprising a wing frame section 26a is supported and positioned by the assembly jig 30. As shown in FIGS. 6A-6C, the assembly jig 30 comprises the fixtures 32, or fixture assemblies, such as a support structure 208 with support legs 210, and a rectangular structure 212 with an alignment rod assembly 214 coupled to the rectangular structure 212.

As shown in FIGS. 6A, 6C, the frame section 26 has first wing lugs 216a on a first side 218a of the frame section 26, where the first wing lugs 216a are coupled, or attached, to the alignment rod assembly 214 of the assembly jig 30. As shown in FIG. 6A, the frame section 26 has a second wing lug 216b on a second side 218b of the frame section 26. The second wing lug 216b has a hole 28 (see FIGS. 6A, 6E, 6F) through which the extending portion 90 (see FIGS. 6A, 6D-6F) of the pin 70 of the support pin assembly 10 is inserted through so that the protruding circumferential portions 92 (see FIG. 6F) with the flat surface portion 96 (see FIG. 6F) are within, and in contact with, the hole 28 of the second wing lug 216b of the frame section 26. In this version, the first wing lugs 216a and the second wing lug 216b are part of the wing frame section 26a or wing assembly. The wing frame section 26a is comprised of numerous details bolted or fastened together. In other versions, the alignment rod assembly 214 may be attached to another locating feature of the wing frame section 26a of the aircraft structure 20. As shown in FIGS. 6A, 6D-6F, the block 34 of the support pin assembly 10 is attached to a first portion 212a of the rectangular structure 212 of the assembly jig 30, via the bolts 178 (see FIGS. 6E, 6F) and the dowels 182 (see FIGS. 6E, 6F).

As shown in FIG. 6C, the support system 12 has two support pin assemblies 10, such as support floating pin assemblies 10a, including a lower support pin assembly 10b and an upper support pin assembly 10c, coupled to the assembly jig 30 and to the frame section 26. As shown in FIG. 6C, the block 34 of the lower support pin assembly 10b is attached to the first portion 212a of the rectangular structure 212 of the fixture 32 of the assembly jig 30, via the bolts 178 (see FIG. 6F) and the dowels 182 (see FIG. 6F), and the upper support pin assembly 10c is attached to a second portion 212b of the rectangular structure 212 of the fixture 32 of the assembly jig 30, via the bolts 178 (see FIG. 6F) and the dowels 182 (see FIG. 6F). As further shown in FIG. 6C, the extending portion 90 of the pin 70 of the lower support pin assembly 10b is inserted through a hole 28, such as a lower hole 28a, of the second wing lug 216b, and the extending portion 90 of the pin 70 of the upper support pin assembly 10c is inserted through a hole 28, such as an upper hole 28b, of the second wing lug 216b. As shown in FIG. 6C, in one version, the two support pin assemblies 10, such as the lower support pin assembly 10b and the upper support pin assembly 10c, provide the clocking feature 134 of the assembly jig 30, to orient and position the frame section 26 of the aircraft structure 20 in the desired orientation 136 (see FIG. 1), and the correct orientation. However, in other versions, one support pin assembly 10 may be used as the clocking feature 134, or more than two support pin assemblies 10 may be used as the clocking feature 134. Other features on the assembly jig 30, such as the alignment rod assembly 214 or the frame section 26 of the assembly jig 30 that the first wing lugs 216a are resting on, may also be used to help locate the aircraft structure 20 to the assembly jig 30, and the aircraft structure 20 is free to rotate around the alignment rod assembly 214 until it is "clocked" in the correct orientation with one or more support pin assemblies 10.

FIGS. 6D-6F show enlarged views of the support pin assembly 10, such as the support floating pin assembly 10a, for example, the lower support pin assembly 10b, with the block 34 attached to the first portion 212a of the rectangular structure 212, via the bolts 178 and the dowels 182. FIGS. 6D-6F further show the extending portion 90 of the pin 70 of the support pin assembly 10, such as the lower support pin assembly 10b, inserted through the hole 28 of the second attach pad 214b. As shown in FIG. 6F, the protruding circumferential portions 92, such as the proximal protruding circumferential portion 92a and the distal protruding circumferential portion 92b, on the extending portion 90 of the pin 70 are positioned within the hole 28, such as the lower hole 28a, in the second wing lug 216b of the frame section 26 of the aircraft structure 20, and the protruding circumferential portions 92 provide nominal adjustment 116 (see FIG. 1) of the pin 70 relative to the hole 28, so that with any occurrence 120 (see FIG. 1) of the binding condition 122 (see FIG. 1) of the pin 70 within the hole 28, the pin 70 is released from the binding condition 122 by rotating the pin 70 via the two or more flat surface portions 96.

The support pin assemblies 10 of FIGS. 6A-6F, such as the support floating pin assemblies 10a, allow for the build up of the wing frame section 26a or wing assembly, without jig lock of the assembly jig 30 or pin binding issues of the pin 70. Thus, the support pin assemblies 10, such as the support floating pin assemblies 10a, provide for jig lock prevention 126 (see FIG. 1) and pin binding prevention 128 (see FIG. 1). In addition, the support pin assemblies 10 of FIGS. 6A-6F, such as the support floating pin assemblies 10a, accurately position and support the frame section 26, such as the wing frame section 26a, for full size determinant assembly 14 (see FIG. 1).

Figure 7:
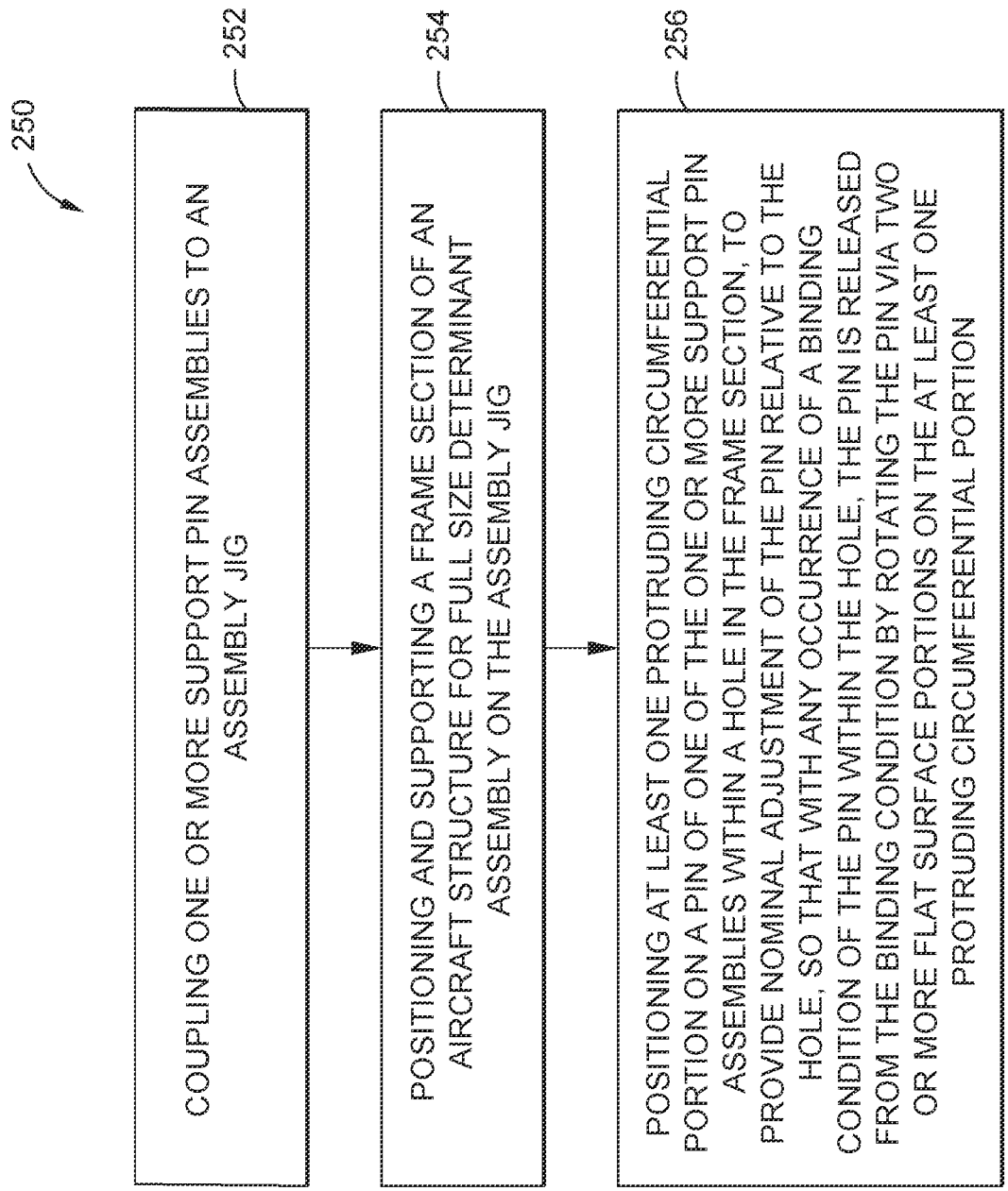
FIG. 7 is an illustration of a flow diagram of an exemplary method of the disclosure.

Now referring to FIG. 7, FIG. 7 is an illustration of a flow diagram of an exemplary version of a method 250 of the disclosure. In another version of the disclosure, there is provided the method 250 of supporting an aircraft structure 20 (see FIG. 1) for full size determinant assembly 14 (see FIG. 1). The blocks in FIG. 7 represent operations and/or portions thereof, or elements, and lines connecting the various blocks do not imply any particular order or dependency of the operations or portions thereof, or elements. FIG. 7 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 7, the method 250 comprises coupling 252 one or more support pin assemblies 10 (see FIGS. 1, 2A, 3), such as one or more support floating pin assemblies 10a (see FIG. 1), to an assembly jig 30 (see FIGS. 1, 6A). Each support pin assembly 10 comprises the block 34 (see FIGS. 1, 2A), discussed in detail above, having the vertical bore 36 (see FIGS. 1, 2G) and the horizontal bore 38 (see FIGS. 1, 2G) intersecting the vertical bore 36, wherein the block 34 is coupled, in one version, to the assembly jig 30, via one or more bolts 178 (see FIG. 6F) and dowels 182 (see FIG. 6F).

Each support pin assembly 10 further comprises the bushing 44 (see FIGS. 1, 2G, 3), discussed in detail above, disposed within the horizontal bore 38 at the first end 40 (see FIGS. 2A, 3) of the block 34. Each support pin assembly 10 further comprises the barrel nut 48 (see FIGS. 1, 2G, 5A), discussed in detail above, having the cylindrical body 50 (see FIGS. 1, 2G, 5A) disposed within the vertical bore 36. In one version, the barrel nut 48 may further have the head portion 52 (see FIG. 2A) integral with the cylindrical body 50. The cylindrical body 50 has the barrel nut hole 64 (see FIGS. 1, 2G, 5A), and optionally one or more counterbores 66 (see FIGS. 1, 2G, 5A), extending transversely through the cylindrical body 50. The barrel nut hole 64 and the optional one or more counterbores 66 are aligned horizontally with the horizontal bore 38 and are coaxial with the horizontal bore 38 in a coaxial alignment 68 (see FIG. 1).

Each support pin assembly 10 further comprises the pin 70 (see FIGS. 1, 2A, 4A-4C), as discussed in detail above. The pin 70 comprises the insertion portion 72 (see FIGS. 1, 2G, 4C) disposed, in one version, within the bushing 44, and in another version, disposed within the bushing 44 and within the one or more counterbores 66. The pin 70 further comprises the interface element 74 (see FIGS. 1, 2G) having the interface element first end 76 (see FIG. 2G) comprising the shaft end 78 (see FIG. 2G) disposed within the insertion portion 72 in a press fit insertion 46b (see FIG. 1), and the interface element second end 84 (see FIG. 2G) comprising the sphere end 86 (see FIG. 2G) disposed within the barrel nut hole 64 in a slip fit insertion 88 (see FIG. 1). The pin 70 further comprises the extending portion 90 (see FIGS. 1, 2G, 4B) extending from the first end 40 of the block 34. The extending portion 90 has at least one protruding circumferential portion 92 (see FIGS. 1, 2A, 4A) formed on the exterior 94 (see FIG. 2A) of the extending portion 90. The at least one protruding circumferential portion 92 has two or more flat surface portions 96 (see FIGS. 1, 2A, 2E) or "flats" machined on opposing sides 98 (see FIGS. 1, 2E) of the at least one protruding circumferential portion 92 to enable the rotation 100 (see FIG. 1) of the pin 70.

Coupling 252 one or more support pin assemblies 10 to the assembly jig 30 may further comprise coupling one or more support pin assemblies 10 to the assembly jig 30 to provide the clocking feature 134 (see FIGS. 1, 6C) of the assembly jig 30, to orient the frame section 26 of the aircraft structure 20 in the desired orientation 136 (see FIG. 1).

Coupling 252 one or more support pin assemblies 10 to the assembly jig 30 may further comprise providing a nominal offset gap 130 (see FIGS. 1, 2H), such as the first nominal offset gap 130a (see FIGS. 1, 2H), between the top side 54 (see FIG. 2H) of the block 34 (see FIG. 2H) and the bottom end 60 (see FIG. 2H) of the head portion 52 (see FIG. 2H) of the barrel nut 48 (see FIG. 2H). In one version, the head portion 52 is integral with the cylindrical body 50 and extends exterior to the vertical bore 36 at the top side 54 of the block 34. Coupling 252 one or more support pin assemblies 10 to the assembly jig 30 mounted to the fixture 32 may further comprise, providing a nominal offset gap 130 (see FIGS. 1, 2H), such as the second nominal offset gap 130b (see FIGS. 1, 2H), between the first end 40 (see FIG. 2H) of the block 34 (see FIG. 2H) and the proximal protruding circumferential portion 92a (see FIG. 2H) proximal to the first end 40 of the block 34.

As shown in FIG. 7, the method 250 further comprises positioning and supporting 254 the frame section 26 (see FIGS. 1, 6A) of the aircraft structure 20 for the full size determinant assembly 14 (see FIG. 1) on the assembly jig 30 (see FIGS. 1, 6A).

Positioning and supporting 254 the frame section 26 of the aircraft structure 20 for the full size determinant assembly 14 on the assembly jig 30 may further comprise, positioning and supporting the frame section 26 comprising the wing frame section 26a (see FIG. 1), of the aircraft structure 20 (see FIG. 1) comprising the wing 22 (see FIG. 1), on the assembly jig 30 (see FIG. 1) comprising the wing assembly jig 30a (see FIG. 1).

As shown in FIG. 7, the method 250 further comprises positioning 256 the at least one protruding circumferential portion 92 (see FIGS. 1, 2A) on the extending portion 90 (see FIGS. 1, 2A) of the pin 70 of one of the one or more support pin assemblies 10 within the hole 28 (see FIGS. 1, 6A) in the frame section 26 (see FIG. 6E) of the aircraft structure 20, to provide nominal adjustment 116 (see FIG. 1) of the pin 70 (see FIG. 6E) relative to the hole 28 (see FIG. 6E), so that with any occurrence 120 (see FIG. 1) of the binding condition 122 (see FIG. 1) of the pin 70 within the hole 28, the pin 70 is released from the binding condition 122 by rotating the pin 70 via the two or more flat surface portions 96 (see FIGS. 1, 2A). Preferably, positioning 256 the at least one protruding circumferential portion 92 on the extending portion 90 of the pin 70 within the hole 28 in the frame section 26 further comprises, positioning 256 two protruding circumferential portions 92 on the extending portion 90 of the pin 70 within the hole 28 in the frame section 26.

Positioning 256 the at least one protruding circumferential portion 92 within the hole 28 in the frame section 26 of the aircraft structure 20 may further comprise releasing the pin 70 from the binding condition 122 (see FIG. 1) by rotating the pin 70 a quarter turn rotation 100a (see FIG. 1), where the at least one protruding circumferential portion 92 has four flat surface portions 96.

Positioning 256 the at least one protruding circumferential portion 92 within the hole 28 in the frame section 26 of the aircraft structure 20 may further comprise releasing the pin 70 from the binding condition 122 (see FIG. 1) by rotating the pin 70 a half turn rotation 100b (see FIG. 1), where the at least one protruding circumferential portion 92 has two flat surface portions 96.

Figure 8:
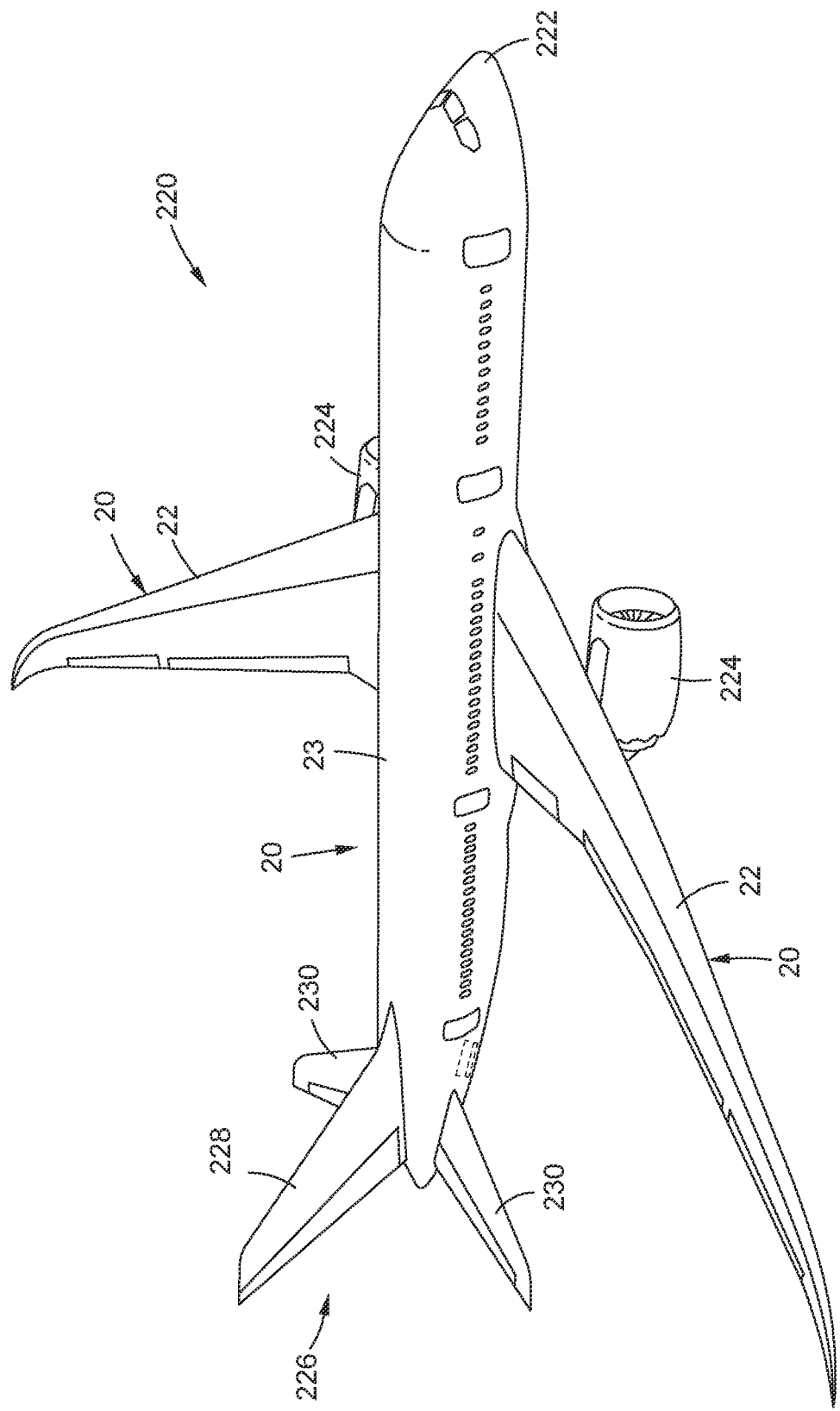
FIG. 8 is an illustration of a perspective view of an exemplary aircraft having wings and a fuselage that may be manufactured using an exemplary version of a support system with one or more support pin assemblies of the disclosure for full size determinant assembly.

Now referring to FIG. 8, FIG. 8 is an illustration of a perspective view of an exemplary aircraft 220 having aircraft structures 20, such as wings 22 and a fuselage 23, that may be manufactured using an exemplary version of the support system 12 (see FIG. 1) with one or more support pin assemblies 10 (see FIGS. 1, 2A, 3) of the disclosure for full size determinant assembly 14 (see FIG. 1), as discussed above. As shown in FIG. 8, the aircraft 220 includes the wings 22, the fuselage 23, a nose 222, engines 224, and an empennage 226. As shown in FIG. 8, the empennage 226 comprises a vertical stabilizer 228 and horizontal stabilizers 230.

Now referring to FIGS. 9 and 10, FIG. 9 is an illustration of a flow diagram of an exemplary aircraft manufacturing and service method 300, and FIG. 10 is an illustration of an exemplary block diagram of an aircraft 316. Referring to FIGS. 9 and 10, versions of the disclosure may be described in the context of the aircraft manufacturing and service method 300 as shown in FIG. 9, and the aircraft 316 as shown in FIG. 10.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the support pin assembly 10 (see FIGS. 1, 2A-2I, 3), the support system 12 (see FIGS. 1, 6A-6F) implementing the support pin assembly 10, and the method 250 (see FIG. 7) provide a custom pin design for the support pin assembly 10 that can be used in a variety of full size determinant assembly build ups 18 and that accurately positions and supports a frame section 26 (see FIGS. 1, 6A), such as a wing frame section 26a (see FIGS. 1, 6A), for full size determinant assembly 14 (see FIG. 1). The novel pin 70 (see FIGS. 4A-4C) has one or more protruding circumferential portions 92 (see FIG. 4A) on the extending portion 90 (see FIG. 4A) of the pin 70 configured to be positioned within a hole 28 (see FIG. 6F) in the frame section 26 (see FIG. 6F) of the aircraft structure 20 (see FIG. 6F) for the full size determinant assembly 14 (see FIG. 1), and configured to provide nominal adjustment 116 (see FIG. 1) such as pin float 118 (see FIG. 1) of the pin 70 relative to the hole 28, so that with any occurrence 120 (see FIG. 1) of the binding condition 122 (see FIG. 1) of the pin 70 within the hole 28, the pin 70 is configured to be released from the binding condition 122 (see FIG. 1) by rotating the pin 70 via the two or more flat surface portions 96. The rotation 100 (see FIG. 1) of the pin 70 may include the quarter turn rotation 100a (see FIG. 1), or the half turn rotation 100b (see FIG. 1), or another suitable rotation. When the at least one protruding circumferential portion 92 has four flat surface portions 96, the quarter turn rotation 100a of the pin 70 is enabled. When the at least one protruding circumferential portion 92 has two flat surface portions 96, the half turn rotation 100b of the pin 70 is enabled. The two or more flat surface portions 96 or "flats" are machined on each protruding circumferential portion 92 of the pin 70, so that if there is a binding condition 122, the pin 70 can be released from the hole 28 with the quarter turn rotation 100a (see FIG. 1) or the half turn rotation 100b (see FIG. 1), or another suitable rotation. The flat surface portions 96 or "flats" of the pin 70 are designed to be inserted through a round engineering feature, such as a hole 28 (see FIG. 6F), on the frame section 26.

The support pin assembly 10, such as the support floating pin assembly 10a, provides for jig lock prevention 126 (see FIG. 1) and pin binding prevention 128 (see FIG. 1). The support pin assembly 10 avoids pin binding in the assembly jig 30. Moreover, the pin 70 can float or slide in and out to allow for adjustment movement of the frame section 26 of the aircraft structure 20 that is being supported during full size determinant assembly 14 (see FIG. 1). The support pin assembly 10 allows for the nominal adjustment 116 (see FIG. 1) or the pin float 118 (see FIG. 1) and the pin release 124 (see FIG. 1) in the event of the binding condition 122 (see FIG. 1) of the pin 70, or pin binding. Thus, the support pin assembly 10 (see FIGS. 1, 2A-2I, 3), the support system 12 (see FIGS. 1, 6A-6E) implementing the support pin assembly 10, and the method 250 (see FIG. 7) solve the problem with accurately positioning and supporting frame sections 26, such as wing frame sections 26a, of aircraft structures 20, for enabling full size determinant assembly 14, and providing means for pin float and pin release in the event of pin binding, and solve the problem with assembly jig lock and pin binding to accurately position and support aircraft structures 20, such as wings 22, for example, frame sections 26 such as wing frame sections 26a, to enable full size determinant assembly 14 (see FIG. 1). In particular, the support pin assembly 10 allows for the build up of the inner wing assembly jig 30b (see FIG. 1) and the inner wing frame section 26b (see FIG. 1) and the build up of the outer wing assembly jig 30c (see FIG. 1) and the outer wing frame section 26c (see FIG. 1), without jig lock or pin binding issues.

In addition, disclosed versions of the support pin assembly 10 (see FIGS. 1, 2A-2I, 3), the support system 12 (see FIGS. 1, 6A-6F) implementing the support pin assembly 10, and the method 250 (see FIG. 7) provide for a support pin assembly 10 that locates the pin 70 (see FIG. 3) through the bushing 44 (see FIG. 3), such as the slotted bushing 44a (see FIG. 3) and into the barrel nut 48 (see FIGS. 2G, 3, 5A) that is a custom barrel nut to assist in the locating feature of the pin 70. The barrel nut 48 (see FIG. 2H) is free to rotate within the vertical bore 36 (see FIG. 2H) of the block 34 (see FIG. 2H). The one or more optional counterbores 66 and the barrel nut hole 64 locate the sphere end 86 (see FIG. 2H) of the interface element 74 (see FIG. 2H). The barrel nut hole 64 is aligned with the horizontal bore 38 and the pin 70.

Further, the support pin assembly 10 allows for nominal offset gaps 130 (see FIGS. 1, 2H), such as the first nominal offset gap 130a (see FIG. 2H) formed between the top side 54 of the block 34 and the bottom end 60 of the head portion 52 of the barrel nut 48, and such as the second nominal offset gap 130b (see FIG. 2H) formed between the first end 40 of the block 34 and the proximal protruding circumferential portion 92a proximal to the first end 40 of the block 34. The nominal offset gaps 130 allow for measurements at the support pin assembly 10 to track how far the support pin assembly 10 has moved. A feeler gauge 132 (see FIG. 1) may be used to check whether the nominal offset gaps 130 are at the 0.1000 NOM (nominal) indicators 131 (see FIG. 2H).

Moreover, versions of the support pin assembly 10 (see FIGS. 1, 2A-2I, 3), the support system 12 (see FIGS. 1, 6A-6F) implementing the support pin assembly 10, and the method 250 (see FIG. 7) provide the clocking feature 134 (see FIGS. 1, 6C) of the assembly jig 30, to orient the frame section 26 of the aircraft structure 20 in a desired orientation 136 (see FIG. 1), when the support system 12 comprises one or more support pin assemblies 10 coupled to the engineering part 24, such as the frame section 26 of the aircraft structure 20. In one version, as shown in FIG. 6C, the clocking feature 134 is provided when one support pin assembly 10, such as a lower support pin assembly 10b (see FIG. 6C) is locating a hole 28 (see FIG. 6C), such as a lower hole 28a (see FIG. 6C), of the frame section 26, and another support pin assembly 10, such as an upper support pin assembly 10c (see FIG. 6C) is locating a hole 28, such as an upper hole 28b (see FIG. 6C), of the frame section 26. However, in other versions, one support pin assembly 10 may be used as the clocking feature 134 or more than two support pin assemblies 10 may be used as the clocking feature 134.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A support pin assembly for full size determinant assembly of an aircraft structure, the support pin assembly comprising:

a block having a vertical bore and a horizontal bore intersecting the vertical bore;

a bushing disposed within the horizontal bore at a first end of the block;

a barrel nut having a cylindrical body disposed within the vertical bore, the cylindrical body having a barrel nut hole extending transversely through the cylindrical body, the barrel nut hole aligned with the horizontal bore; and a pin comprising:

an insertion portion disposed within the bushing;

an interface element having an interface element first end disposed within the insertion portion and an interface element second end disposed within the barrel nut hole; and an extending portion extending from the first end of the block, the extending portion having at least one protruding circumferential portion formed on an exterior of the extending portion, the at least one protruding circumferential portion having two or more flat surface portions on opposing sides of the at least one protruding circumferential portion to enable rotation of the pin, wherein the at least one protruding circumferential portion on the extending portion of the pin is configured to be positioned within a hole in a frame section of the aircraft structure for the full size determinant assembly, the frame section is configured to be positioned on and is configured to be supported by an assembly jig, and the support pin assembly is configured for coupling to the assembly jig, and the at least one protruding circumferential portion on the extending portion of the pin is configured to provide nominal adjustment of the pin relative to the hole, so that with any occurrence of a binding condition of the pin within the hole, the pin is configured to be released from the binding condition by rotating the pin via the two or more flat surface portions.

2. The support pin assembly of claim 1, wherein the bushing comprises a slotted bushing having a slot with a slotted bushing pin disposed within the slot, and further wherein the slotted bushing is press fit into the horizontal bore at the first end of the block.

3. The support pin assembly of claim 1, wherein the barrel nut further has a head portion integral with the cylindrical body and extending exterior to the vertical bore at a top side of the block, and a nominal offset gap is formed between the top side of the block and a bottom end of the head portion.

4. The support pin assembly of claim 1, wherein the barrel nut has an alignment slot formed in a top end that is visible to enable alignment of the barrel nut hole with the horizontal bore.

5. The support pin assembly of claim 1, wherein the cylindrical body of the barrel nut has one of:
   a counterbore on one side of the barrel nut hole, the counterbore extending transversely through the cylindrical body, or
   counterbores on both sides of the barrel nut hole, the counterbores extending transversely through the cylindrical body.

6. The support pin assembly of claim 1, wherein the extending portion of the pin has a first end comprising a pin head portion having an outer surface with sight lines for visual inspection of pin alignment of the pin relative to the block.

7. The support pin assembly of claim 1, wherein a nominal offset gap is formed between the first end of the block and a proximal protruding circumferential portion proximal to the first end of the block.

8. The support pin assembly of claim 1, wherein the at least one protruding circumferential portion has four of the flat surface portions to enable a quarter turn rotation of the pin.

9. The support pin assembly of claim 1, wherein the at least one protruding circumferential portion has two of the flat surface portions to enable a half turn rotation of the pin.

10. The support pin assembly of claim 1, wherein the at least one protruding circumferential portion comprises two protruding circumferential portions, including a proximal protruding circumferential portion proximal to the first end of the block and a distal protruding circumferential portion distal to the first end of the block, and further wherein the distal protruding circumferential portion has an outer diameter that is greater than an outer diameter of the proximal protruding circumferential portion.

11. A support system for full size determinant assembly of an aircraft structure, the support system comprising:
   an assembly jig;
   a frame section of the aircraft structure for the full size determinant assembly, the frame section positioned on and supported by the assembly jig; and
   one or more support pin assemblies coupled to the assembly jig, each support pin assembly comprising:
      a block coupled to the assembly jig, the block having a vertical bore and a horizontal bore intersecting the vertical bore;
      a bushing disposed within the horizontal bore at a first end of the block;
      a barrel nut having a cylindrical body disposed within the vertical bore, the cylindrical body having a barrel nut hole extending transversely through the cylindrical body, the barrel nut hole aligned with the horizontal bore; and
      a pin comprising:
         an insertion portion disposed within the bushing;
         an interface element having an interface element first end disposed within the insertion portion and an interface element second end disposed within the barrel nut hole; and
         an extending portion extending from the first end of the block, the extending portion having at least one protruding circumferential portion formed on an exterior of the extending portion, the at least one protruding circumferential portion having two or more flat surface portions on opposing sides of the at least one protruding circumferential portion to enable rotation of the pin,
      wherein the at least one protruding circumferential portion on the extending portion of the pin is positioned within a hole in the frame section of the aircraft structure, and provides nominal adjustment of the pin relative to the hole, so that with any occurrence of a binding condition of the pin within the hole, the pin is released from the binding condition by rotating the pin via the two or more flat surface portions.

12. The support system of claim 11, wherein the support system comprises the one or more support pin assemblies providing a clocking feature of the assembly jig, to orient the frame section of the aircraft structure in a desired orientation.

13. The support system of claim 11, wherein:
   the aircraft structure comprises a wing;
   the frame section comprises a wing frame section; and
   the assembly jig comprises a wing assembly jig.

14. The support system of claim 11, wherein the at least one protruding circumferential portion has one of,
   four of the flat surface portions to enable a quarter turn rotation of the pin; or
   two of the flat surface portions to enable a half turn rotation of the pin.

15. A method of supporting an aircraft structure for full size determinant assembly, the method comprising:
   coupling one or more support pin assemblies to an assembly jig, each support pin assembly comprising:
      a block having a vertical bore and a horizontal bore intersecting the vertical bore, wherein the block is coupled to the assembly jig;
      a bushing disposed within the horizontal bore at a first end of the block;
      a barrel nut having a cylindrical body disposed within the vertical bore, the cylindrical body having a barrel nut hole extending transversely through the cylindrical body, the barrel nut hole aligned with the horizontal bore; and
      a pin comprising:
         an insertion portion disposed within the bushing;
         an interface element having an interface element first end disposed within the insertion portion and an interface element second end disposed within the barrel nut hole; and
         an extending portion extending from the first end of the block, the extending portion having at least one protruding circumferential portion formed on an exterior of the extending portion, the at least one protruding circumferential portion having two or more flat surface portions on opposing sides of the at least one protruding circumferential portion to enable rotation of the pin;
   positioning and supporting a frame section of the aircraft structure for the full size determinant assembly on the assembly jig; and
   positioning the at least one protruding circumferential portion on the extending portion of the pin of one of the one or more support pin assemblies within a hole in the frame section of the aircraft structure, to provide nominal adjustment of the pin relative to the hole, so that with any occurrence of a binding condition of the pin within the hole, the pin is released from the binding condition by rotating the pin via the two or more flat surface portions.

16. The method of claim 15, wherein coupling the one or more support pin assemblies to the assembly jig, further comprises:
   coupling the one or more support pin assemblies to the assembly jig, to provide a clocking feature of the assembly jig, to orient the frame section the aircraft structure in a desired orientation.

17. The method of claim 15, wherein coupling one or more support pin assemblies to the assembly jig, further comprises:
   providing a first nominal offset gap between a top side of the block and a bottom end of a head portion of the barrel nut, the head portion being integral with the cylindrical body and extending exterior to the vertical bore at the top side of the block; and
   providing a second nominal offset gap between the first end of the block and a proximal protruding circumferential portion proximal to the first end of the block.

18. The method of claim 15, wherein positioning and supporting the frame section of the aircraft structure for the full size determinant assembly on the assembly jig, further comprises:
   positioning and supporting the frame section comprising a wing frame section, of the aircraft structure comprising a wing, on the assembly jig comprising a wing assembly jig.

19. The method of claim 15, wherein positioning the at least one protruding circumferential portion within the hole in the frame section of the aircraft structure, further comprises:
   releasing the pin from the binding condition by rotating the pin a quarter turn rotation, where the at least one protruding circumferential portion has four of the flat surface portions.

20. The method of claim 15, wherein positioning the at least one protruding circumferential portion within the hole in the frame section of the aircraft structure, further comprises:
   releasing the pin from the binding condition by rotating the pin a half turn rotation, where the at least one protruding circumferential portion has two of the flat surface portions.

* * * * *